(12) United States Patent
Gonia et al.

(10) Patent No.: US 7,688,802 B2
(45) Date of Patent: Mar. 30, 2010

(54) SYSTEM AND METHOD FOR TIME SYNCHRONIZATION IN A WIRELESS NETWORK

(75) Inventors: Patrick S. Gonia, Maplewood, MN (US); Soumitri N. Kolavennu, Blaine, MN (US); Arun V. Mahasenan, Kerala (IN); Ramakrishna S. Budampati, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/464,030

(22) Filed: May 11, 2009

(65) Prior Publication Data

US 2009/0290572 A1 Nov. 26, 2009

Related U.S. Application Data

(60) Provisional application No. 61/055,817, filed on May 23, 2008.

(51) Int. Cl.
*H04J 3/06* (2006.01)

(52) U.S. Cl. ............... 370/350; 370/328; 370/338; 455/502

(58) Field of Classification Search ......... 370/304, 370/503, 350, 324, 328, 338, 458, 597–509; 455/502, 507
See application file for complete search history.

(56) References Cited

U.S. PATENT DOCUMENTS

| | | | |
|---|---|---|---|
| 4,679,189 A | 7/1987 | Olson et al. | |
| 5,898,826 A | 4/1999 | Pierce et al. | |
| 7,031,308 B2 | 4/2006 | Garcia-Luna-Aceves et al. | |
| 7,035,937 B2 | 4/2006 | Haas et al. | |
| 7,203,743 B2 | 4/2007 | Shah-Heydari | |
| 2002/0072329 A1* | 6/2002 | Bandeira et al. | 455/7 |
| 2002/0176396 A1 | 11/2002 | Hammel et al. | |
| 2004/0174829 A1 | 9/2004 | Ayyagari | |
| 2004/0259533 A1 | 12/2004 | Nixon et al. | |
| 2005/0281215 A1 | 12/2005 | Budampati et al. | |
| 2006/0039347 A1* | 2/2006 | Nakamura et al. | 370/350 |
| 2006/0104301 A1* | 5/2006 | Beyer et al. | 370/445 |
| 2006/0128349 A1* | 6/2006 | Yoon | 455/343.2 |

(Continued)

OTHER PUBLICATIONS

Dr. Soumitri Kolavennu, Presentation, "WNSIA MAC Layer", ISA SP100 meeting, Feb. 14, 2007, 24 pages.
Ying Zhang, et al., "A Learning-based Adaptive Routing Tree for Wireless Sensor Networks", Journal of Communications, vol. 1, No. 2, May 2006, p. 12-21.

(Continued)

*Primary Examiner*—Kamran Afshar
(74) *Attorney, Agent, or Firm*—Munck Carter, LLP

(57) ABSTRACT

A system includes multiple wireless nodes forming a cluster in a wireless network, where each wireless node is configured to communicate and exchange data wirelessly based on a clock. One of the wireless nodes is configured to operate as a cluster master. Each of the other wireless nodes is configured to (i) receive time synchronization information from a parent node, (ii) adjust its clock based on the received time synchronization information, and (iii) broadcast time synchronization information based on the time synchronization information received by that wireless node. The time synchronization information received by each of the other wireless nodes is based on time synchronization information provided by the cluster master so that the other wireless nodes substantially synchronize their clocks with the clock of the cluster master.

20 Claims, 33 Drawing Sheets

U.S. PATENT DOCUMENTS

| | | |
|---|---|---|
| 2006/0274644 A1 | 12/2006 | Budampati et al. |
| 2006/0274671 A1 | 12/2006 | Budampati et al. |
| 2008/0043637 A1 | 2/2008 | Rahman |
| 2008/0267259 A1 | 10/2008 | Budampati et al. |
| 2008/0273547 A1 | 11/2008 | Phinney |
| 2009/0022121 A1 | 1/2009 | Budampati et al. |
| 2009/0034441 A1 | 2/2009 | Budampati et al. |
| 2009/0109889 A1 | 4/2009 | Budampati et al. |

OTHER PUBLICATIONS

Yau-Ming Sun, et al., "An Efficient Deadlock-Free Tree-Based Routing Algorithm for Irregular Wormhole-Routed Networks Based on the Turn Model", Proceedings of the 2004 International Conference on Parallel Processing (ICPP'04), 10 pages.

Sejun Song, "Fault Recovery Port-based Fast Spanning Tree Algorithm (FRP-FAST) for the Fault-Tolerant Ethernet on the Arbitrary Switched Network Topology", 2001 IEEE, p. 325-332.

* cited by examiner

SYSTEM AND METHOD FOR TIME SYNCHRONIZATION IN A WIRELESS NETWORK

CROSS-REFERENCE TO RELATED APPLICATIONS

This application claims priority under 35 U.S.C. §119(e) to U.S. Provisional Patent Application No. 61/055,817 filed on May 23, 2008, which is hereby incorporated by reference.

GOVERNMENTAL RIGHTS

The U.S. Government has a paid-up license in this invention and the right in limited circumstances to require the patent owner to license others on reasonable terms as provided for by the terms of a contract awarded by the Department of Energy.

TECHNICAL FIELD

This disclosure relates generally to wireless networks and more specifically to a system and method for time synchronization in a wireless network.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities. Process control systems routinely include one or more wireless networks containing various wireless devices, such as wireless sensors and wireless actuators.

Devices in wireless networks (such as wireless networks in process control systems, batch control systems, or building HVAC control systems) may need to be synchronized in time with one another. This may be necessary or desirable for various reasons, such as to ensure that one wireless node transmits data at a time when another wireless node is prepared to receive the data. However, robust and accurate time synchronization is often very difficult to achieve, particularly in large wireless networks. This problem is exacerbated by the dynamic nature of wireless links between the wireless devices.

SUMMARY

This disclosure provides a system and method for time synchronization in a wireless network.

In a first embodiment, a system includes multiple wireless nodes forming a cluster in a wireless network, where each wireless node is configured to communicate and exchange data wirelessly based on a clock. One of the wireless nodes is configured to operate as a cluster master. Each of the other wireless nodes is configured to (i) receive time synchronization information from a parent node, (ii) adjust its clock based on the received time synchronization information, and (iii) broadcast time synchronization information based on the time synchronization information received by that wireless node. The time synchronization information received by each of the other wireless nodes is based on time synchronization information provided by the cluster master so that the other wireless nodes substantially synchronize their clocks with the clock of the cluster master.

In a second embodiment, a wireless node includes a transceiver configured to communicate with other wireless nodes including a second wireless node and a third wireless node in a wireless network cluster. The wireless node also includes a controller configured to receive time synchronization information from the second wireless node and substantially synchronize the wireless node to the second wireless node using the received time synchronization information. The controller is also configured to initiate transmission of time synchronization information to the third wireless node, where the third wireless node is configured to substantially synchronize to the second wireless node using the transmitted time synchronization information.

In a third embodiment, a method includes receiving time synchronization information from a first wireless node at a second wireless node. The method also includes substantially synchronizing the second wireless node to the first wireless node using the received time synchronization information. The method further includes transmitting time synchronization information from the second wireless node to a third wireless node in the cluster. The third wireless node is configured to substantially synchronize to the second wireless node using the transmitted time synchronization information. The wireless nodes form at least part of a cluster in a wireless network.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 28, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
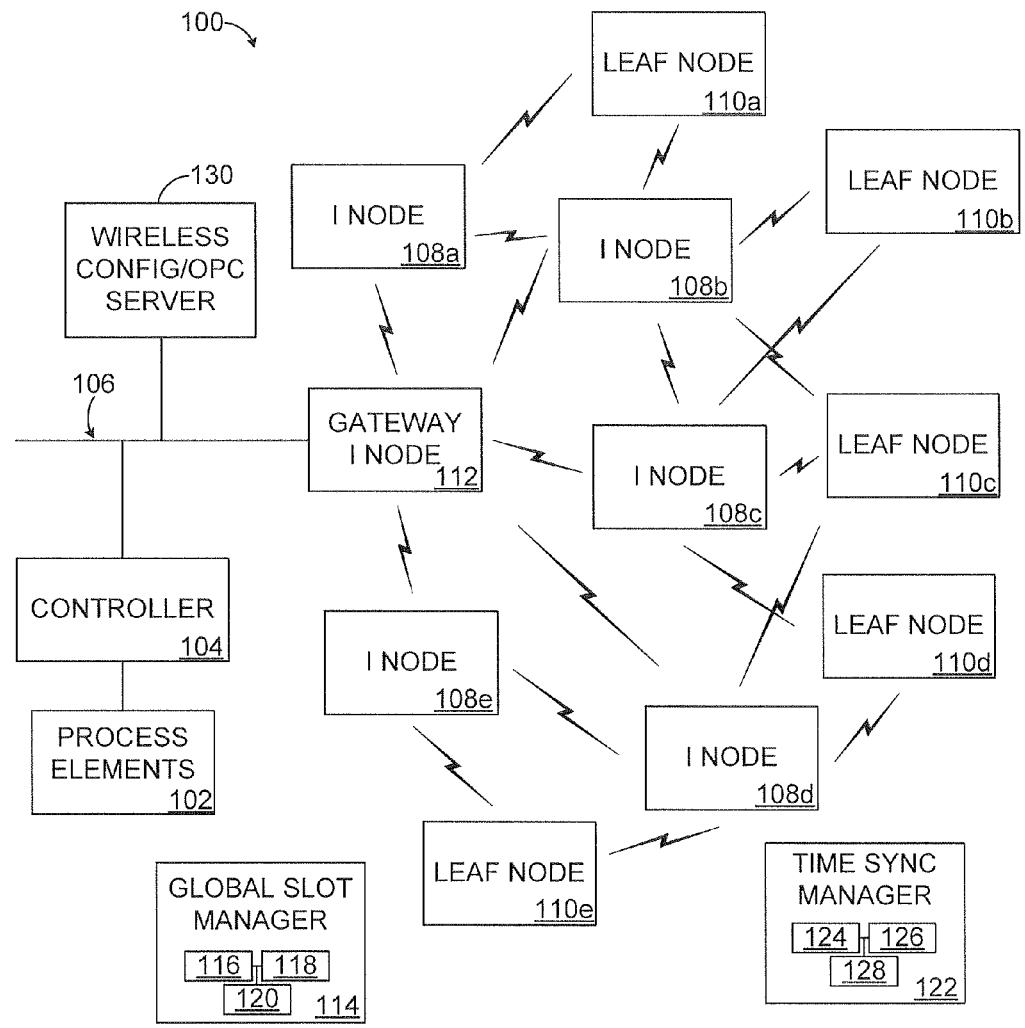
FIG. 1 illustrates an example process control system according to this disclosure.

FIG. 1 illustrates an example process control system 100 according to this disclosure. The embodiment of the process control system 100 shown in FIG. 1 is for illustration only. Other embodiments of the process control system 100 could be used without departing from the scope of this disclosure.

In this example embodiment, the process control system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system may represent any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to provide control signals to others of the process elements 102, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks (WANs), all or a portion of a global network, or any other communication system or systems at one or more locations.

In FIG. 1, the process control system 100 also includes one or more wireless networks for communicating with wireless sensors or other devices. In this example, a wireless network includes infrastructure nodes ("I nodes") 108a-108e, leaf nodes 110a-110e, and a gateway infrastructure node 112.

The infrastructure nodes 108a-108e and the leaf nodes 110a-110e engage in wireless communications with each other. For example, the infrastructure nodes 108a-108e may receive data transmitted over the network 106 (via the node 112) and wirelessly communicate the data to the leaf nodes 110a-110e. Similarly, the leaf nodes 110a-110e may wirelessly communicate data to the infrastructure nodes 108a-108e for forwarding to the network 106 (via the node 112). In addition, the infrastructure nodes 108a-108e may wirelessly exchange data with one another. In this way, the nodes 108a-108e form a wireless network capable of providing wireless coverage to leaf nodes and other devices in a specified area, such as a large industrial complex.

In this example, the nodes 108a-108e and 110a-110e are divided into infrastructure nodes and leaf nodes. The infrastructure nodes 108a-108e typically represent routing devices that can store and forward messages for other devices. Infrastructure nodes 108a-108e are typically line-powered devices, meaning these nodes receive operating power from an external source. Infrastructure nodes 108a-108e are typically not limited in their operations since they need not minimize power consumption to increase the operational life of their internal power supplies. On the other hand, the leaf nodes 110a-110e are generally non-routing devices that do not store and forward messages for other devices. Leaf nodes 110a-110e typically represent devices powered by local power supplies, such as nodes that receive operating power from internal batteries or other internal power supplies. Leaf nodes 110a-110e are often more limited in their operations in order to help preserve the operational life of their internal power supplies.

The nodes 108a-108e and 110a-110e include any suitable structures facilitating wireless communications, such as radio frequency (RF) frequency hopping spread spectrum (FHSS) transceivers. The nodes 108a-108e and 110a-110e could also include other functionality, such as functionality for generating or using data communicated over the wireless network. For example, the leaf nodes 110a-110e could represent wireless sensors used to measure various characteristics within an industrial facility. The sensors could collect and communicate sensor readings to the controller 104 via the node 112. The leaf nodes 110a-110e could also represent actuators that receive control signals from the controller 104 and adjust the operation of the industrial facility. In this way, the leaf nodes may include or operate in a similar manner as the process elements 102 physically connected to the controller 104. The leaf nodes 110a-110e could further represent handheld user devices (such as INTELATRAC devices from HONEYWELL INTERNATIONAL INC.), mobile stations, programmable logic controllers, or any other or additional devices. The infrastructure nodes 108a-108e may also include any of the functionality of the leaf nodes 110a-110e or the controller 104.

The gateway infrastructure node 112 communicates wirelessly with, transmits data to, and receives data from one or more infrastructure nodes and possibly one or more leaf nodes. The node 112 may convert data between protocol(s) used by the network 106 and protocol(s) used by the nodes 108a-108e and 110a-110e. For example, the node 112 could convert Ethernet-formatted data transported over the network 106 into a wireless protocol format (such as an IEEE 802.11a, 802.11b, 802.11g, 802.11n, 802.15.3, 802.15.4, or 802.16 format) used by the nodes 108a-108e and 110a-110e. The node 112 could also convert data received from one or more of the nodes 108a-108e and 110a-110e into Ethernet-formatted data for transmission over the network 106. In addition, the node 112 could support various functions, such as network creation and security, used to create and maintain a wireless network. The gateway infrastructure node 112 includes any suitable structure for facilitating communication between components or networks using different protocols.

In particular embodiments, the various nodes in the wireless network of FIG. 1 form a mesh network communicating at 2.4 GHz or 5.8 GHz. Also, in particular embodiments, data can be injected into the wireless mesh network through the infrastructure nodes or leaf nodes, thus providing versatile, multifunctional, plant-wide coverage for wireless sensing, asset location tracking, personnel tracking, wireless communications, and any other or additional functionality as desired.

A global slot manager 114 facilitates the identification and assignment of time slots to nodes in the wireless network. For example, communications between the nodes could occur during multiple time slots, and at least two wireless nodes may communicate during a slot. The global slot manager 114 determines which time slots are assigned to a node for communications with other nodes. The global slot manager 114 includes any hardware, software, firmware, or combination thereof for managing time slots used for wireless communications. The global slot manager 114 could, for instance, include at least one processor 116 and at least one memory 118 configured to store instructions and data used, collected, or generated by the at least one processor 116. The global slot manager 114 could also include at least one network interface 120 for communicating over at least one wired or wireless network, such as an RF transceiver.

A time synchronization manager 122 facilitates the synchronization of nodes in a wireless network. For example, nodes can be grouped into clusters, where nodes in a cluster are substantially synchronized with one another. The time synchronization manager 122 can help maintain synchronization of nodes and control merging of clusters. The time synchronization manager 122 includes any hardware, software, firmware, or combination thereof facilitating synchronization of wireless network nodes. The time synchronization manager 122 could, for instance, include at least one processor 124 and at least one memory 126 configured to store instructions and data used, collected, or generated by the at least one processor 124. The time synchronization manager 122 could also include at least one network interface 128 for communicating over at least one wired or wireless network, such as an RF transceiver.

A wireless configuration and OLE for Process Control (OPC) server 130 can configure and control various aspects of the process control system 100. For example, the server 130 could configure the operation of the nodes 108a-108e, 110a-110e, and 112. The server 130 could also support security in the process control system 100, such as by distributing cryptographic keys or other security data to various components in the process control system 100 (like the nodes 108a-108e, 110a-110e, and 112). The server 130 includes any hardware, software, firmware, or combination thereof for configuring wireless networks and providing security information.

In one aspect of operation, various nodes in the wireless network (such as the nodes 108a-108e) can be divided into clusters, and time synchronization occurs among nodes in each of the clusters. Also, different clusters can be merged if the wireless coverage areas of the clusters overlap. Additional details regarding these functions are provided below.

Although FIG. 1 illustrates one example of a process control system 100, various changes may be made to FIG. 1. For example, the process control system 100 could include any number of process elements, controllers, networks (wired or wireless), infrastructure nodes (gateway or other), leaf nodes, and servers. Also, the functional division shown in FIG. 1 is for illustration only. Various components in FIG. 1 could be combined, subdivided, or omitted and additional components could be added according to particular needs. In addition, FIG. 1 illustrates one example operational environment where time synchronization and cluster merges could be used. This functionality could be used with any suitable device or system (whether or not process control-related). As particular examples, this functionality could also be used with batch control systems, building HVAC control systems, or other types of systems that use wireless devices.

Figure 2:
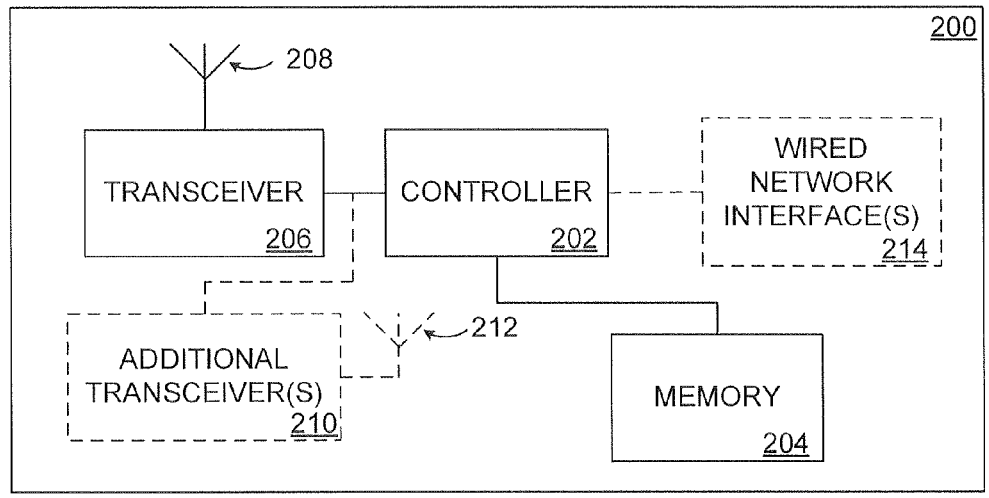
FIG. 2 illustrates an example wireless node in a wireless network according to this disclosure.

FIG. 2 illustrates an example wireless node 200 in a wireless network according to this disclosure. The wireless node 200 could, for example, represent a leaf node, infrastructure node, or gateway infrastructure node in the system 100 of FIG. 1. The embodiment of the wireless node 200 shown in FIG. 2 is for illustration only. Other embodiments of the wireless node 200 could be used without departing from the scope of this disclosure.

As shown here, the node 200 includes a controller 202, which controls the overall operation of the node 200. For example, the controller 202 may receive or generate data to be transmitted, and the controller 202 could provide the data to other component(s) in the node 200 for transmission over a wired or wireless network. The controller 202 could also receive data over a wired or wireless network and use or forward the data. As a particular example, the controller 202 in a sensor leaf node could provide sensor data for transmission, and the controller 202 in an actuator leaf node could receive and implement control signals (the leaf node could represent a combined sensor-actuator device). As another example, the controller 202 in an infrastructure node could receive data transmitted wirelessly, determine a next hop for the data (if any), and provide the data for transmission to the next hop (if any). As a third example, the controller 202 in a gateway infrastructure node 112 could receive data from a wired network and provide the data for wireless transmission (or vice versa). The controller 202 includes any hardware, software, firmware, or combination thereof for controlling operation of the node 200. As particular examples, the controller 202 could represent a processor, microprocessor, microcontroller, field programmable gate array, or other processing or control device.

A memory 204 is coupled to the controller 202. The memory 204 stores any of a wide variety of information used, collected, or generated by the node 200. For example, the memory 204 could store information received over a network that is to be transmitted over the same or other network. The memory 204 includes any suitable volatile and/or non-volatile storage and retrieval device(s).

The node 200 also includes a wireless transceiver 206 coupled to an antenna 208. The transceiver 206 and antenna 208 can be used to communicate wirelessly with other devices. For example, in a leaf node, the transceiver 206 and antenna 208 can be used to communicate with infrastructure nodes. In an infrastructure or gateway infrastructure node, the transceiver 206 and antenna 208 can be used to communicate with leaf nodes or other infrastructure nodes. One or more additional transceivers 210 could also be used in the node 200. For instance, in an infrastructure or gateway infrastructure node, the additional transceiver(s) 210 could be used to communicate with Wi-Fi or IEEE 802.11 devices (such as wireless controllers or hand-held user devices) or other infrastructure or gateway infrastructure nodes. The additional transceivers 210 may be coupled to their own antennas 212 or share one or more common antennas (such as antenna 208). Each transceiver includes any suitable structure for transmitting and/or receiving wireless signals. In some embodiments, each transceiver represents an RF transceiver, such as an RF FHSS transceiver. Also, each antenna could represent an RF antenna. It may be noted that any other suitable wireless signals could be used to communicate. In addition, each transceiver could include a transmitter and a separate receiver.

If the node 200 represents a gateway infrastructure node, the node 200 may further include one or more wired network interfaces 214. The wired network interfaces 214 allow the node 200 to communicate over one or more wired networks, such as the network 106 (as shown in FIG. 1). Each wired network interface 214 includes any suitable structure for transmitting and/or receiving signals over a wired network, such as an Ethernet interface.

Although FIG. 2 illustrates one example of a wireless node 200 in a wireless network, various changes may be made to FIG. 2. For example, various components in FIG. 2 could be combined, subdivided, or omitted and additional components could be added according to particular needs. Also, a "wireless node" represents any device that can transmit and/or receive data wirelessly, even if the "wireless node" has the ability to transmit and/or receive data over a wired connection as well.

Figure 3:
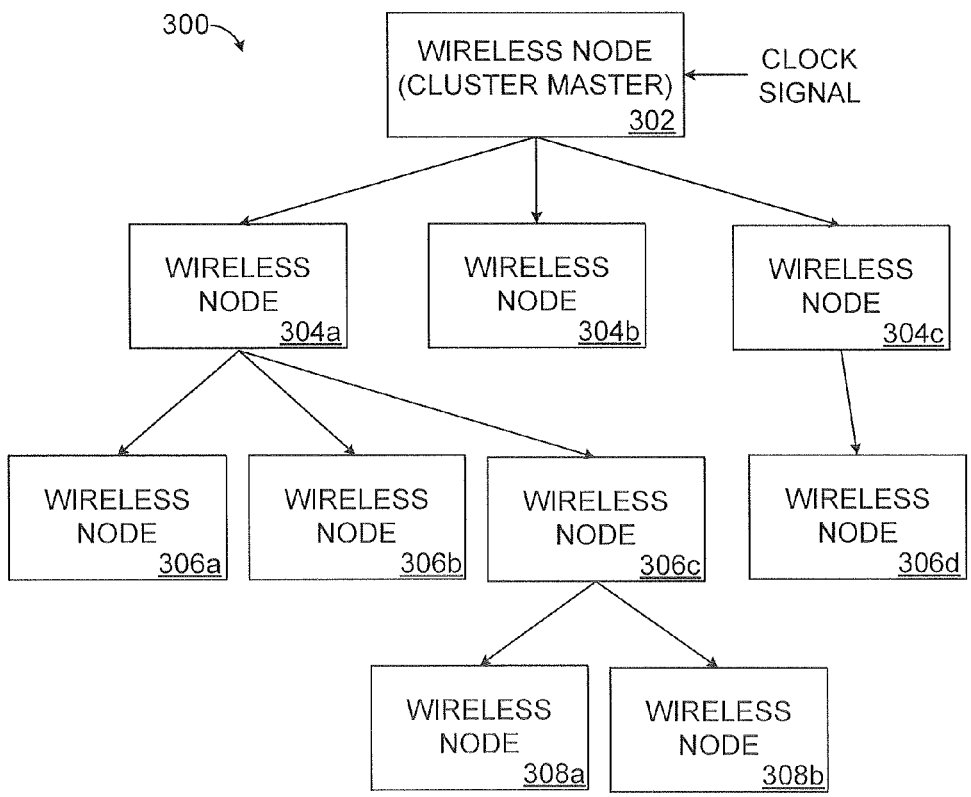
FIG. 3 illustrates an example cluster of wireless nodes according to this disclosure.

FIG. 3 illustrates an example cluster 300 of wireless nodes according to this disclosure. The embodiment of the cluster 300 shown in FIG. 3 is for illustration only. Other embodiments of the cluster 300 shown in FIG. 3 could be used without departing from the scope of this disclosure.

As shown here, the wireless nodes in the cluster 300 are arranged in a hierarchy, where one or more nodes in one level pass time synchronization information to one or more nodes in a lower level. The cluster 300 includes a single wireless node 302, which represents a cluster master, in its highest level. The cluster master represents the wireless node that generates or receives (possibly from a source that is not in the cluster) a clock signal and then sends out timing information to other nodes in the cluster 300. The wireless node 302 could receive a clock signal from any suitable source, such as an atomic clock, a global positioning system (GPS) clock, or other source that is not a member of the cluster.

During operation, the wireless node 302 provides time synchronization information (such as information based on the clock signal) to nodes 304a-304c in the next level of the cluster 300. The wireless nodes 304a and 304c pass the time synchronization information to wireless nodes 306a-306c and 306d, respectively, in the next level of the cluster 300. The wireless node 306c provides the time synchronization information to wireless nodes 308a-308b in the last level of the cluster 300. In this configuration, the nodes form a spanning tree with the cluster master as the root of the spanning tree. The levels of the cluster 300 could be numbered, such as when the cluster master is level zero, the next level is level one, and so on. In general, a node providing time synchronization information is called a "master" or "parent," while a node receiving time synchronization information is called a "child."

Each of the wireless nodes 304a-308c could synchronize its internal clock with the time synchronization information it receives. In this way, the wireless nodes 304a-308c can be substantially synchronized with the wireless node 302. The wireless nodes 304a-308c could be "substantially" synchronized with the cluster master because there is some delay in receiving the time synchronization information (such as due to electromagnetic propagation of wireless signals and the inaccuracy associated with relaying time synchronization information using wireless messages). However, these delays could be ignored by the wireless nodes or estimated and taken into account when adjusting the nodes' internal clock. In general, the synchronization is adequate for the particular application requiring time synchronization such as to allow time-coordinated communications between wireless nodes, where transmitting nodes transmit data at specified times (such as assigned time slots) and receiving nodes are prepared to receive data in those time slots.

While a single cluster 300 is shown in FIG. 3, a wireless network could include any number of clusters 300. Also, as described below, the configuration of the cluster 300 can change, such as when a link to a cluster master is lost or when a cluster 300 is reorganized. For example, it may be more desirable for a cluster 300 to be wider and less desirable for the cluster 300 to be taller. The cluster 300 could be reorganized when it reaches an undesirable depth or when it can be made wider. In addition, as described below, multiple clusters 300 can be merged into a single cluster, such as when the wireless coverage areas of the clusters overlap.

Although FIG. 3 illustrates one example of a cluster 300 of wireless nodes, various changes may be made to FIG. 3. For example, a cluster 300 could include any number of wireless nodes in any suitable arrangement. Moreover, the cluster 300 could include any number of hierarchical levels. In addition, note that the links shown in FIG. 3 only represent the flow of time synchronization information, and other data flows could be created between any nodes in FIG. 3.

Figure 4:
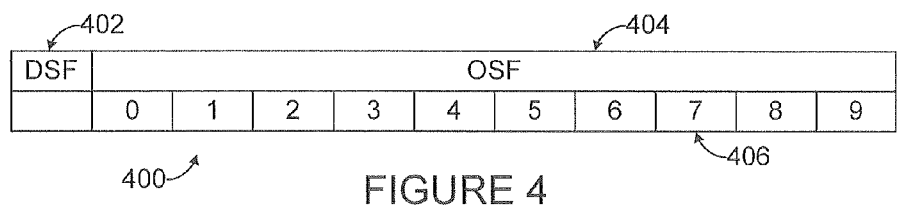
FIG. 4 illustrates an example time slot frame for organizing time-structured wireless communications according to this disclosure.

FIG. 4 illustrates an example time slot frame 400 for organizing time-structured wireless communications according to this disclosure. The embodiment of the frame 400 shown in FIG. 4 is for illustration only. Other embodiments of the frame 400 could be used without departing from the scope of this disclosure.

In some embodiments, communications between nodes in a wireless network could occur as follows. A hyperperiod can be defined as a thirty second (or other) periodic cycle. Within each hyperperiod is a discovery time period (DTP), such as a ten second period. The DTP is subdivided into repeating frames, an example of which is shown in FIG. 4. A frame 400 could, for example, represent a 250 millisecond frame. Within each frame 400 is a discovery subframe (DSF) 402 (which occupies the first 11 milliseconds of the frame 400) and an operation subframe (OSF) 404 (which occupies the remainder of the frame 400). The operation subframe 404 is divided into time slots 406 (such as ten slots).

Nodes engage in various handshaking and other operations during the discovery subframe 402. For example, infrastructure nodes 108a-108e could broadcast beacon signals during the discovery subframe 402, allowing other nodes to identify the infrastructure nodes. This may allow new nodes coming online in the wireless network to identify potential infrastructure nodes that can communicate with the new nodes. The operation subframe 404 then allows the nodes to exchange data being transported through the wireless network, such as sensor data sent from leaf nodes or actuator data sent to leaf nodes.

In the operation subframe 404, various slots 406 could represent Guaranteed Leaf Access (GLA) slots, or slots 406 where normal data traffic (such as sensor and actuator data) is sent. The GLA-designated slots also represent time slots 406 when periodic time synchronization can occur. For example, infrastructure nodes (except cluster masters) can receive GLA messages during "receive GLA slots," where the GLA messages contain time synchronization information. The infrastructure nodes can use the information in the GLA messages to synchronize with parent nodes. Infrastructure nodes can also transmit GLA messages in "transmit GLA slots," and nodes receiving those messages can synchronize with masters. This allows various nodes to receive time synchronization information and to adjust their internal clocks to be substantially synchronized with the clock in the cluster master.

The GLA slots could have a specified periodicity, such as once every five seconds. Also, GLA slots could have a fixed periodicity or be random. With fixed GLA slots, the first slot 406 in the operation subframe 404 of each frame 400 could be a dedicated GLA slot. As a particular example, the first slot 406 in one frame 400 could be used to receive a GLA message, while the first slot 406 in the next frame 400 could be used to transmit a GLA message. With random GLA slots, random slots 406 can be used to exchange GLA messages between pairs of infrastructure nodes.

The structure of the frame 400 shown in FIG. 4 is used in the following figures to describe other operations in a wireless network, such as:

power up and discovery: operations performed when a node first comes online;

cluster election: operations performed when a node selects a cluster to join;

time synchronization: operations performed to synchronize nodes in a cluster;

recovery: operations performed when a cluster master fails or when a link with a cluster master is lost; and merging: operations performed when two clusters are merged into a single larger cluster.

Although FIG. 4 illustrates one example of a frame 400 for wireless communications, various changes may be made to FIG. 4. For example, while shown as including ten slots 406, the frame 400 could include any number of slots 406. Also, while various operations are described below using the frame 400, these operations could use other frames or timing structures.

FIGS. 5 through 8 illustrate an example discovery mechanism for wireless network nodes according to this disclosure. The details of the discovery mechanism shown in FIGS. 5 through 8 are for illustration only. Other discovery mechanisms could be used without departing from the scope of this disclosure.

When a new node comes online in a wireless network, the node has no sense of the current system time. As a result, the new node does not know if the system is in the discovery period (DSF 402) or the operational period (OSF 404) of a frame 400. The node can therefore take one or several steps to synchronize with the boundary of the frames 400. For example, the node could select a particular frequency and wait to receive a message, such as a beacon-like broadcast message or a regular message intended for another node, that contains time synchronization information.

Figure 5:
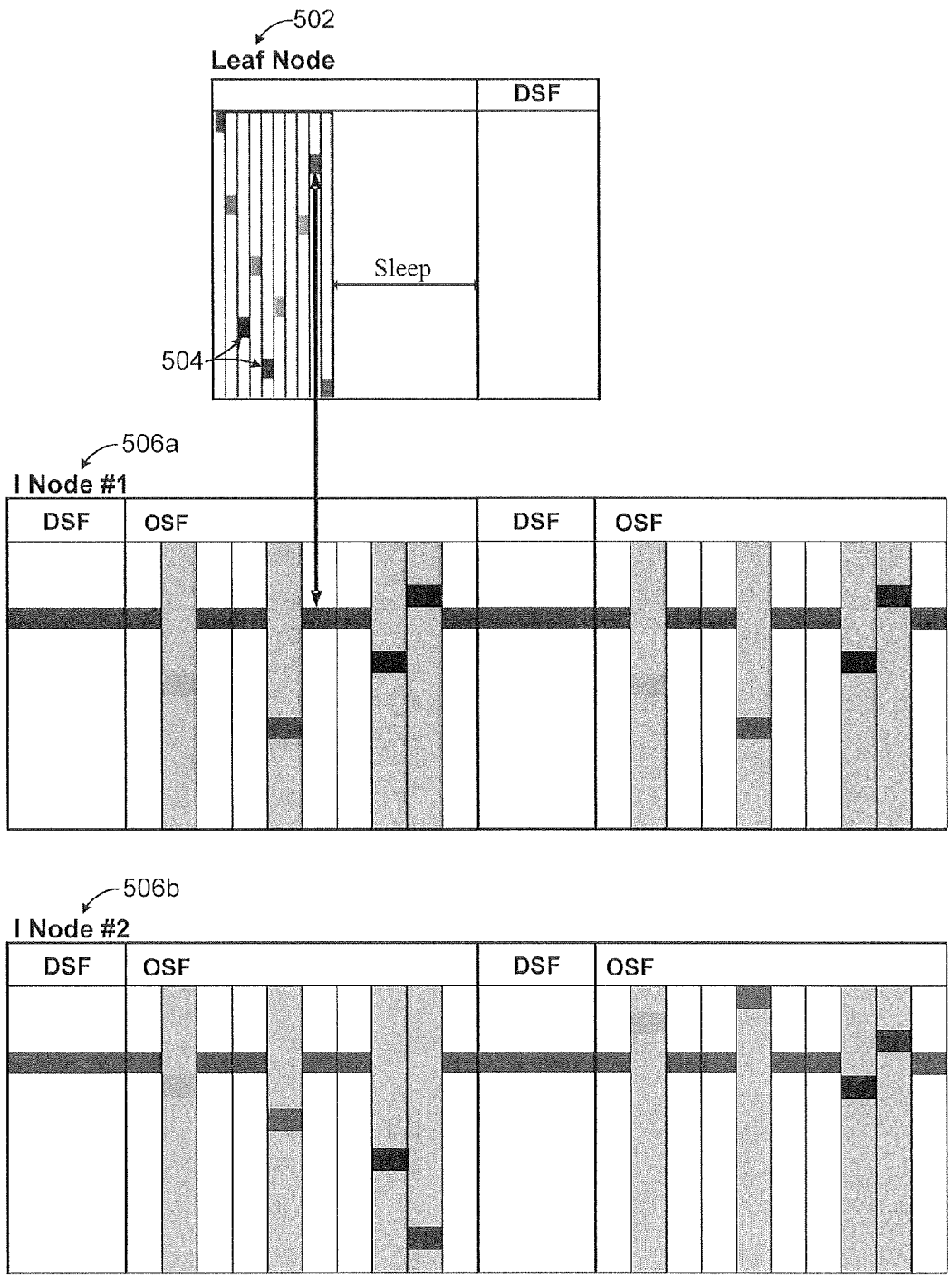
FIGS. 5 through 8 illustrate an example discovery mechanism for wireless network nodes according to this disclosure.

Another approach is shown in FIG. 5, where a new node 502 broadcasts time synchronization requests 504. These requests 504 are sent on multiple frequencies, such as frequencies known to be used in a wireless network. In FIG. 5, the new node 502 represents a leaf node, which can communicate with at least two infrastructure nodes 506a-506b. In this case, the infrastructure node 506a receives at least one of the requests 504 during a time slot in the operation subframe 404 and replies by sending time synchronization information to the new node 502. The time synchronization information allows the new node 502 to identify a current system time and the time when the next frame 400 begins. At this point, the new node 502 is only synchronized with the boundaries of the frames 400 (it knows when one frame 400 ends and another frame 400 begins). The new node 502 can enter a sleep state until the discovery subframe 402 of the following frame 400. Note that shaded time slots in OSFs 404 here represent GLA slots.

Figure 6:
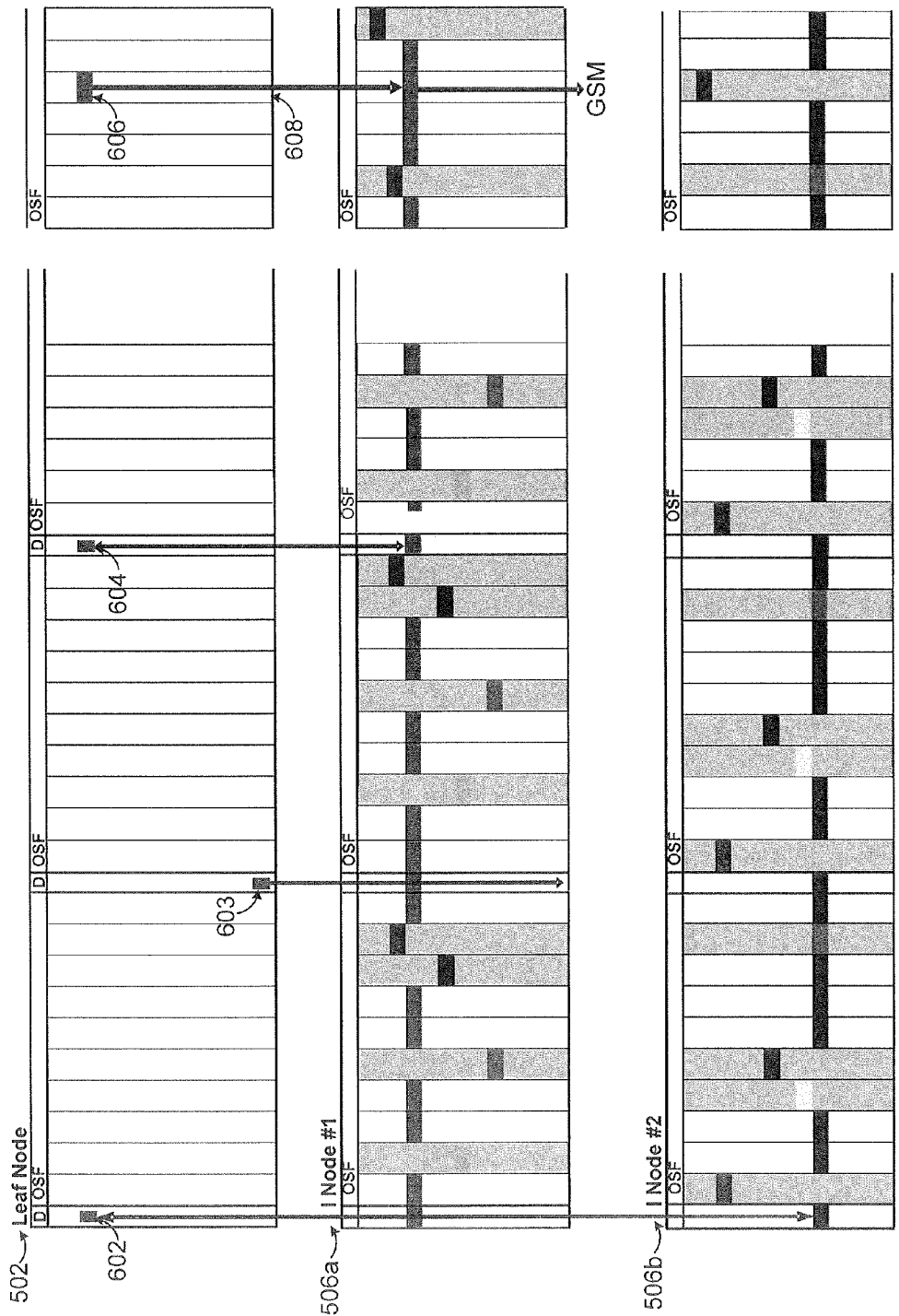

Once a new node 502 has figured out the current system time, the new node 502 can use the discovery subframes 402 in subsequent frames 400 to discover neighboring nodes (such as neighboring infrastructure nodes) without interfering with normal system communications carried out during the OSF 404 of the frames 400. For example, as shown in FIG. 6, the new node 502 can broadcast short messages 602-604 and receive responses from neighboring infrastructure nodes 506a-506b (note that message 603 does not lead to a response). This allows the new node 502 to record various information about each neighboring infrastructure node, such as a receive signal strength indicator (RSSI) value, cluster number, cluster level, and GLA slot of the neighboring infrastructure node and a time slot temporarily assigned to the new node 502.

Once the new node 502 has a list of its neighboring infrastructure nodes, the new node 502 can rank the neighboring infrastructure nodes and select the top neighboring infrastructure nodes (such as the top four or five). For example, the new node 502 can rank all neighboring infrastructure nodes having at least a minimum RSSI value in order of increasing cluster level. A message 606 could then be sent to one of the infrastructure nodes 506a during a subsequent time slot 608 (such as a time slot temporarily assigned to the new node 502). The message 606 identifies the top neighboring infrastructure nodes selected by the new node 502 (and may or may not identify the infrastructure node 506a). The infrastructure node 506a could represent the "best" infrastructure node identified by the new node 502, such as the infrastructure node with at least the minimum RSSI value and the lowest cluster level.

The message 606 is passed to the global slot manager 114 (shown in FIG. 1), which includes or has access to information identifying all infrastructure nodes and their free and allocated time slots 406 (shown in FIG. 4). The global slot manager 114 uses information about the free time slots of the infrastructure nodes identified by the new node 502 to select two infrastructure nodes having a common free time slot 406. These two identified infrastructure nodes represent the infrastructure nodes that the new node 502 will communicate with once the new node 502 enters normal operation.

Figure 7:
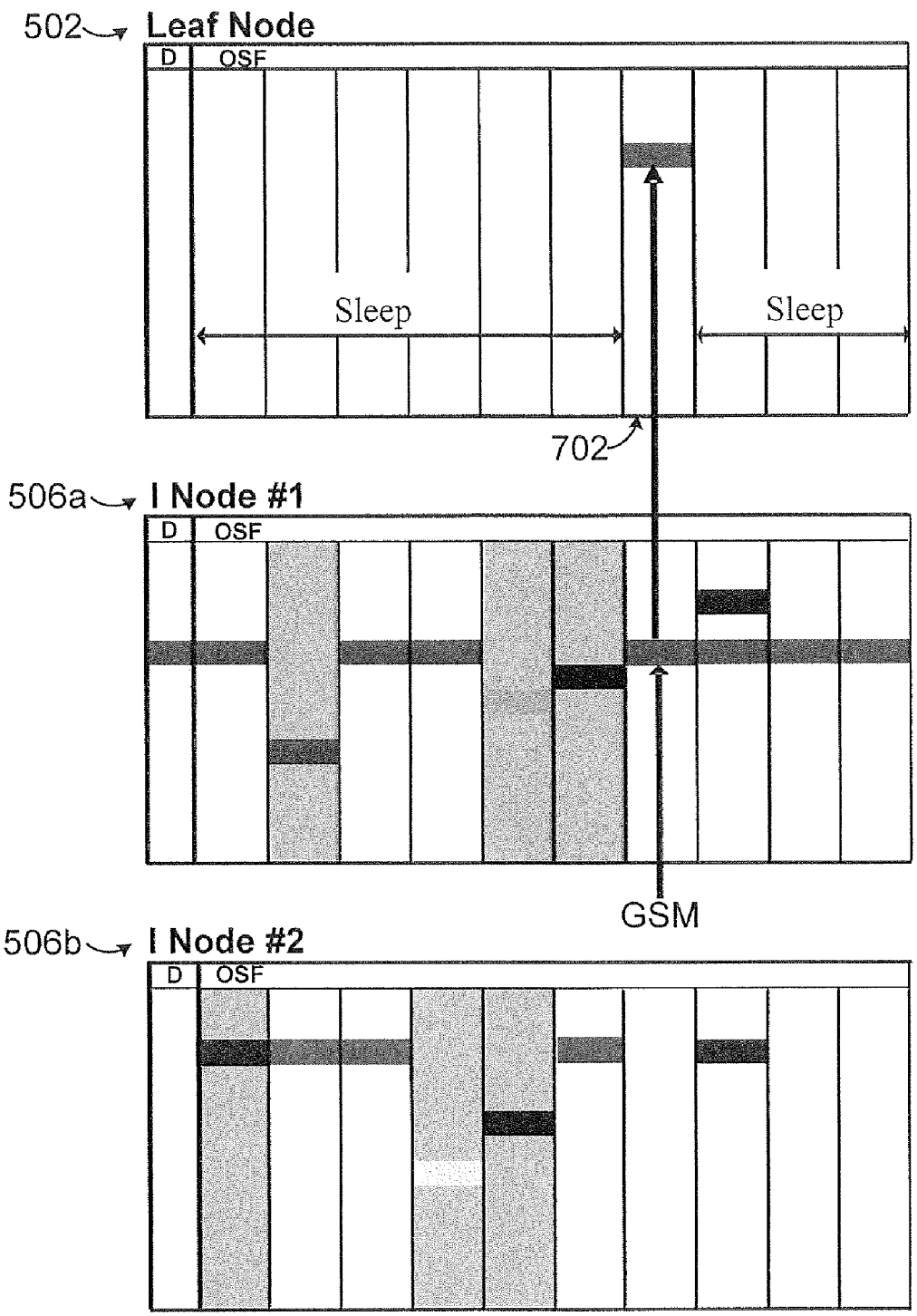

As shown in FIG. 7, the identities of the two selected infrastructure nodes are provided by the global slot manager 114 to the infrastructure node 506a. Note, however, that there may be only a single infrastructure node selected by the global slot manager 114. Other information could also be provided, such as the time slot selected for communications with the infrastructure node(s). The infrastructure node 506a passes this information to the new node 502, such as during a pre-negotiated time slot 702 using a pre-negotiated frequency.

Figure 8:
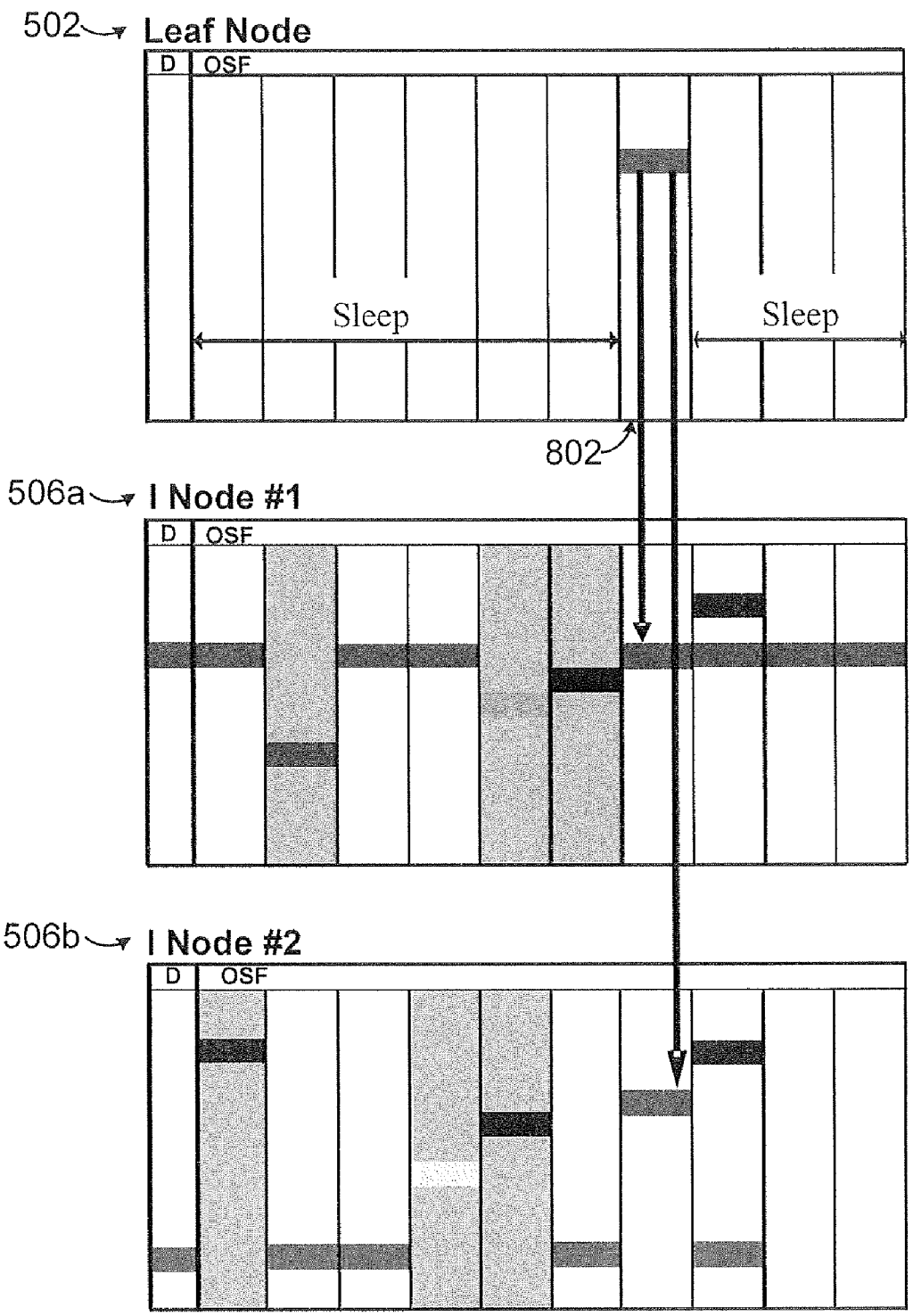

At this point, the new node 502 knows which infrastructure node(s) it should communicate with and the time slot(s) during which those communications should occur. As shown in FIG. 8, the new node 502 transmits data to the one or two selected infrastructure nodes during a time slot 802 (which represents the time slot selected by the global slot manager 114). The infrastructure nodes selected by the global slot manager 114 here include the infrastructure nodes 506a-506b. However, the infrastructure nodes selected by the global slot manager 114 need not include the infrastructure node that responds to a request 504 or that receives message 606.

This process could occur for any node coming online in a wireless network. This process allows the node to synchronize with the frame boundary in a particular cluster of nodes in the wireless network. It also allows the node to identify the best or other infrastructure nodes around the node. It further allows the node to receive a slot assignment and to communicate with at least one of the infrastructure nodes around the node. In this way, the node can join and be synchronized with a cluster.

The messages transmitted in FIGS. 5 through 8 could have any suitable format. For example, messages 504 could represent clock sync beacons having the form:

```
typedef struct pkt_t_BeaconClock {
    uint8    packet_id;   // overloaded [2 <reserved>][2 <reserved>]
                          // [4 <packet_id>]
    uint8    pan_id;      // Personal Area Network (PAN) identifier
    uint16   inode_id;    // Leaf identifier for INode-LeafNode sync.
                          // INode identifier for INode-INode sync.
    uintB    misc;        // Miscellaneous field
} PACKED_ATTRIB pkt_BeaconClock;
```

A response to a message 504 (provided by an infrastructure node) could represent a clock sync acknowledgement, which can have the form:

```
typedef struct pkt_t_ClkSyncAck {
    uint8    packet_id;
    uint8    pan_id;
    uint16   node_id;          // Leaf identifier for INode-LeafNode sync.
                               // INode identifier for INode-INode sync.
    uint16   ticks_left;       // High order bit (sign) used to denote
                               // OSF or DSF; number of crystal ticks
                               // before slot 406 expires
    uint16   slot_number;      // Number assigned to time slot 406
    uint8    hyperPeriodNumber; // Identifies current hyperperiod
    uint16   cluster_id;       // Identifies cluster where INode resides
} PACKED_ATTRIB pkt_ClkSyncAck;
```

Messages 602-604 could represent RSSI beacon requests that have the same form as the clock sync beacon shown above. RSSI beacon acknowledgements (sent by infrastructure nodes in response to the RSSI beacon requests) could have the form:

```
typedef struct pkt_t_RSSISyncAck {
    uint8    packet_id;
    uint8    pan_id;
    uint16   leaf_id;       // Identifies node intended to receive ack
    uint16   inode_id;      // Identifies INode sending ack
    uint8    rssi;          // Identifies RSSI of new node at INode
    uint16   slot_number;   // Slot number used to talk to INode
    uint16   INDSFFHPhase;  // INode's DSF frequency hopping phase
    uint8    tx_gla_slot;   // Transmit GLA slot assigned to INode
    uint16   INOSFFHPhase;  // INode's OSF frequency hopping phase
    uint16   cluster_id;
    uint8    level;         // Cluster level of INode
    uint16   parent_list;   // Variable size, such as 2 bytes*level
} PACKED_ATTRIB pkt_RSSISyncAck;
```

The "slot_number," "INDSFFHPhase," "tx_gla_slot," and "INOSFFHPhase" allow the new node to communicate with the responding infrastructure node (at least temporarily). The "parent_list" identifies the chain of clock sync parents of the infrastructure node sending the RSSI beacon acknowledgement. The "parents" refer to all nodes (including the cluster master) through which time synchronization information passes to reach the infrastructure node sending the beacon acknowledgement.

The messages 606 could represent a slot requests having the form:

```
typedef struct pkt_t_INLN_SlotRequest {
    uint8    packet_id;
    uint8    pan_id;
    uint16   leaf_id;
    uint16   inode_1_id;    // Top INode selected by transmitting node
    uint8    length;        // overloaded [3 <reserved>][5 <length>]
    uint16   inode_2_id;    // 2nd INode selected by transmitting node
    uint16   inode_3_id;    // 3rd INode selected by transmitting node
    uint16   inode_4_id;    // 4th INode selected by transmitting node
    uint64   ieee_addr;     // Address of new node (like MAC address)
    uint16   duty_cycle;    // overloaded [14 <duty_cycle>]
                            // [2 <freq_seed> (bits 9,8)]
    uint8    freq_seed;     // overloaded [8 <freq_seed> (bits 7-0)]
} PACKED_ATTRIB pkt_INLN_SlotRequest;
```

The "duty_cycle" value identifies the reporting period of a leaf node (and can be set to zero for infrastructure nodes). The "freq_seed" value identifies how the frequency of the new node 502 can be determined.

Slot request acknowledgements can be sent by infrastructure nodes receiving the slot requests and can have the form:

```
typedef struct pkt_t_INLN_SlotRequestAck {
    uint8    packet_id;
    uint8    pan_id;
    uint16   leaf_id;
    uint16   inode_id;
    int8     clock_fix;   // Used to adjust clock of new node
    uint8    freq;        // Used to adjust frequency of new node
} PACKED_ATTRIB pkt_INLN_SlotRequestAck;
```

A slot request ping (used to ping an infrastructure node to verify that a prior slot request was received) can have a similar form (without the "clock_fix" and "freq" fields).

Once a time slot is selected by the global slot manager 114, a slot request response is sent to the new node 502. The slot request response could have the form:

```
typedef struct pkt_t_INLN_SlotRequestResponse {
    uint8    packet_id;
    uint8    pan_id;
    uint16   leaf_id;
    uint16   inode_id;
    uint16   allocated_leaf_id;   // Identifier assigned to new node
    uint16   slot_number;         // Slot number assigned to new node
    uint16   GLA_slot_number;     // GLA slot assigned to new node
    uint8    clock_fix;
    uint16   INOSFFHPhase;
    uint16   primary_inode_id;   // 1st INode assigned to new node
    uint16   secondary_inode_id; // 2nd INode assigned to new node
} PACKED_ATTRIB pkt_INLN_SlotRequestResponse;
```

Data can then be sent from the new node 502 to the identified infrastructure node(s). The data could be contained in data messages having the form:

```
typedef struct pkt_t_INLN_Data {
    uint8    packet_id;
    uint8    pan_id;
    uint16   destination_id;  // MAC destination address
    uint16   leaf_id;         // MAC source address
    uint8    QoSTag_fields;   // MAC overloaded [4 <seq>][4 <QoS>]
    uint8    length;          // valid 'data' length
    uint8    data[pkt_INLN_DataFieldLen]; // Data payload
} PACKED_ATTRIB pkt_INLN_Data;
```

The "QoSTag_fields" defines the desired quality of service for the data message.

Data messages received by an infrastructure node can be acknowledged using data acknowledgements, which could have the form:

```
typedef struct pkt_t_INLN_DataAck {
    uint8    packet_id;
    uint8    pan_id;
    uint16   leaf_id;
    uint16   inode_id;
    uint16   ticks_left;    // crystal ticks left in current slot
    uint16   slot_number;
    uint8    hyperPeriodNumber;
    uint16   cluster_id; } PACKED_ATTRIB pkt_INLN_DataAck;
```

This acknowledgement contains timing data (ticks_left, slot_number, hyperPeriodNumber) that allows a node to maintain synchronization with the infrastructure node. If data messages require certain qualities of service, the data acknowledgements could have the form:

```
typedef struct pkt_t_INLN_CCQDataAck {
    uint8    packet_id;    // overloaded [2 <Reserved>][1 <more bit>]
                           // [1 <awake bit>] [4 <packet_id>]
    uint8    pan_id;
    uint16   leaf_id;
    uint8    QoSTag_fields; // added for output data flow
                           // overloaded [1 <QoS relevance>] [2 <QoS Class>]
                           // [1 <Tag# field relevance>] [4 <Tag No.>]
    uint16   inode_id; } PACKED_ATTRIB pkt_INLN_CCQDataAck;
```

The "QoSTag_fields" contains various data regarding the QoS being provided. A CCQ ping could have the same form as the CCQ data acknowledgement.

Finally, as noted above, GLA time slots can be used to pass time synchronization information between nodes. The messages transmitted during the GLA slots could represent GLA messages having the form:

```
typedef struct pkt_t_GLA_Data {
    uint8    packet_id;
    uint8    pan_id;
    uint16   inode_id;
    uint8    no_of_LeafNodes;    // # of leaf nodes served by INode
    uint16   ticks_left;
    uint16   slot_number;
    uint8    hyperPeriodNumber;
    uint16   cluster_id;
    uint8    level;
    uint16   curINFHFreqChannel;  // For tracking backup masters
    uint8    new_gla_slot;        // New GLA slot for INode
    uint8    old_gla_countdown;   // After this many GLA Tx, node
                                  // will jump to new GLA slot.
    uint8    jumping; // 1 indicates cluster is going to jump
    uint8    clusterMasterChanging;   // 1 indicates cluster master
                                      // is going to change
    uint8    hpWait;      // Wait for # of hyperperiods to jump
    uint8    hpDelta;     // Hyperperiod difference with a detected
                          // cluster
    uint16   delta; // Time delta with the detected cluster
    uint32   reserved;
    uint16   parent_list[MAX_CLUSTER_LEVEL]; // Parents of INode
    uint16   leaf_id_list[pkt_LENGTH_GLA_DataFieldLen]; // leaf
                          // nodes served by INode (variable length field)
}PACKED_ATTRIB pkt_GLA_Data;
```

This GLA time sync message contains timing data (ticks_left, slot_number, hyperPeriodNumber) that allows a node to maintain synchronization with the parent node. The "curINFHFreqChannel" represents a change in the infrastructure node's frequency hopping pattern, which allows nodes to update information about the infrastructure node when the infrastructure node is used as a backup master (described below). The "new_gla_slot" is used to identify a new GLA slot that is going to be used by the infrastructure node after the number of GLA transmissions identified by the "old_gla_countdown" value occurs. As described in more detail below, the "hpWait," "hpDelta," and "delta" are used to adjust the time of nodes in a cluster that is being merged.

Although FIGS. 5 through 8 illustrate one example of a discovery mechanism for wireless network nodes, various changes may be made to FIGS. 5 through 8. For example, other types of messages could be used here. Also, an infrastructure node or other device could identify a common time slot available from multiple infrastructure nodes and assign the time slot to a node (without using a centralized slot manager). In addition, the discovery mechanism is not limited to use with just new nodes and can be used with other nodes (such as nodes restarting after a power failure).

FIGS. 9A through 9D illustrate example recovery and cluster modification mechanisms for wireless network nodes according to this disclosure. The details of the mechanisms shown in FIGS. 9A through 9D are for illustration only. Other recovery and cluster modification mechanisms could be used without departing from the scope of this disclosure.

Figure 9A:
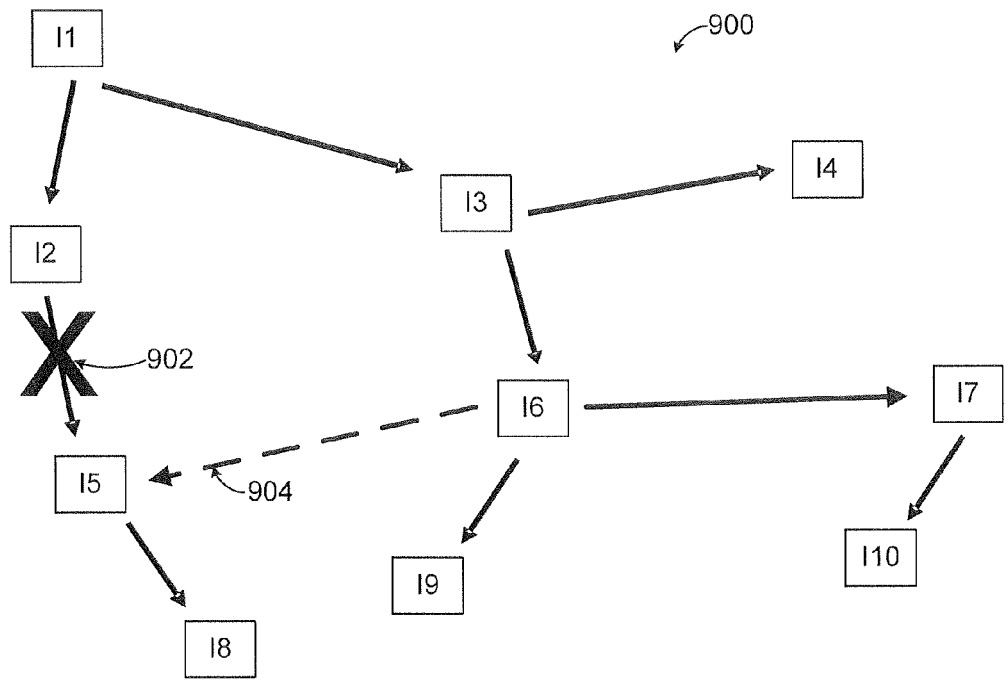
FIGS. 9A through 9D illustrate example recovery and cluster modification mechanisms for wireless network nodes according to this disclosure.

In FIG. 9A, a cluster 900 includes ten infrastructure nodes I1-I10. Here, node I1 denotes the current cluster master, so time synchronization information originates at node I1 and is passed down through the other nodes I2-I10. For example, node I6 receives the time synchronization information from its parent node I3. This makes node I3 the "master" or "parent" of node I6 and node I6 the "child" of node I3 (at least in terms of cluster structure).

As shown here, node I5 ordinarily receives time synchronization information from node I2. However, in this example, a communication link 902 between nodes I2 and I5 is interrupted. This could be due to various reasons, such as a failure of node I2, a change in location or operation of node I2, or new construction around node I2. Whatever the cause, node I5 loses contact with its master, preventing node I5 from receiving information from that master.

As described in more detail below, a node can identify both a master and at least one backup master. During normal operation, the node can receive time synchronization information from its master via a uni-directional time sync message transmission. When communications with its master are lost, the node can begin using time sync information provided by one of its backup masters. In FIG. 9A, node I5 initially communicates with its normal master (node I2) but continues to monitor transmissions over a communication link 904 from a backup master (node I6). This allows node I5 to maintain the necessary information for communicating with the backup master if necessary. As a result, when the communication link 902 is lost, node I5 can continue to receive time synchronization information and maintain synchronization with the cluster 900 via node I6.

Figure 9B:
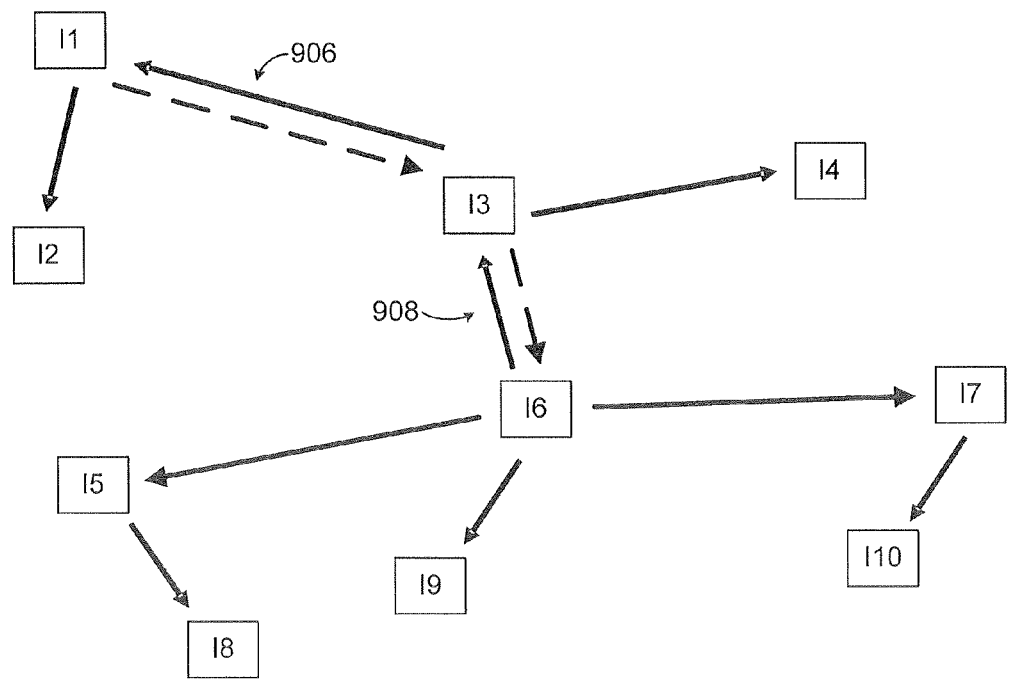

With the loss of communication link 902 and the active use of communication link 904, the shape of the cluster 900 changes. As a result, the cluster 900 may now be less wide than desired or more deep than desired. When this occurs, the cluster 900 can be "pivoted" to make a different node act as the cluster master. An example of this is shown in FIG. 9B, where node I6 is going to be made the cluster master of the cluster 900. In order to do this, the direction of time synchronization information flows that are directly between the old and new cluster masters are reversed. For example, the directional communication link 906 between nodes I1 and I3 is reversed, and the directional communication link 908 between nodes I3 and I6 is reversed (the dashed lines represent the old links, and the solid lines represent the new links). Also, nodes I1 and I3 can change their receive GLA slots (I1's receive GLA slot can be changed to I3's transmit GLA slot, and I3's receive GLA slot can be changed to I6's transmit GLA slot). At this point, a cluster 900' shown in FIG. 9C has been formed with node I6 as the new cluster master and with fewer levels or hops to reach the cluster master.

Note that reducing the number of levels in a cluster improves the accuracy of time synchronization across the cluster, so it may be desirable to reduce the number of levels in a cluster. Also note that the pivoting of a cluster can be initiated in any suitable manner. For example, a cluster could be reorganized based on user input or automatically. Regarding automatic triggering of a pivot, the global slot manager 114 or the time synchronization manager 122 could monitor the operation of the nodes and determine when a cluster pivot is desirable. For instance, the global slot manager 114 or the time synchronization manager 122 could compute a Pivot-Function value for each node i of a cluster:

$$PivotFunction(i) = CurrentMaxLevel - MaxLevel_i.$$

Here, CurrentMaxLevel represents the number of levels in a cluster, and $MaxLevel_i$ represents number of levels that would exist if node i was acting as the cluster master. If node i has a PivotFunction value greater than zero, node i represents a more optimal node to act as the cluster master. The global slot manager 114 or the time synchronization manager 122 could therefore select the node with the largest PivotFunction value and cause that node to become the cluster master of the cluster.

In the example shown in FIG. 9A, a link between a node in "level 1" and a node in "level 2" of a cluster is lost. However, it is also possible for one or more links directly to a cluster master to be lost. This could occur, for example, due to failure of the cluster master itself. An example of this is shown in FIG. 9D, where a cluster 950 (similar to the initial cluster 900) loses both communication links 952-954 to the cluster master (node I1). At this point, various actions could occur. For instance, each node on "level 1" of the cluster 950 (nodes I2 and I3) could simply become cluster masters of two new independent clusters, which could possibly be merged later using the cluster merge mechanism described below.

As another example, a delay (such as a random delay and/or a deterministic delay) could be implemented in each node I2 and I3. After its delay, each node I2 and I3 could determine whether it hears from another "level 1" node. The first node to detect another "level 1" node could make that "level 1" node its master. As a particular example, if node I3 ends its delay first, it could detect node I2 and make node I2 its master. Node I2 becomes the new cluster master, and nodes I3 and I5 represent the new "level 1" nodes of the cluster.

As a third example, when a node in "level 1" loses contact with its cluster master, the node can send RSSI beacons in discovery subframes 402 to discover neighboring infrastructure nodes. If neighboring infrastructure nodes with equal cluster levels (sibling nodes) or higher cluster levels are found, one of the siblings can be selected as the new cluster master (such as the sibling with the lowest network address). If only neighboring infrastructure nodes with higher cluster levels are found, the "level 1" node can become a cluster master for those higher-level nodes. If only higher-level neighbors belonging to a different cluster are found, the neighbor with the lowest level is selected, and a cluster merge (described below) can be initiated. If a higher-level node ("level 2" or above) loses contact with its master and a neighboring infrastructure node with a lower cluster level is found, the higher-level node can make that neighboring infrastructure node its new master. For example, in FIG. 9D, if infrastructure node I5 loses contact with node I2, it could detect nodes I3, I6, and I8 and make node I3 its new master (since node I3 has the lowest cluster level). At this point, node I5 will adjust its cluster level (if necessary).

In any event, once a new cluster master is selected for all or a portion of the cluster 950, the nodes in the cluster 950 can be updated. For example, nodes below the new cluster master can have their cluster levels adjusted accordingly. In addition, some leaf nodes may be affected if their primary and secondary infrastructure nodes split into different clusters, which could happen if a node is forced to become a cluster master. In this case, a leaf node could remain connected with the infrastructure node in the same cluster as the leaf node and a new infrastructure node can be assigned to the leaf node.

Figure 9C:
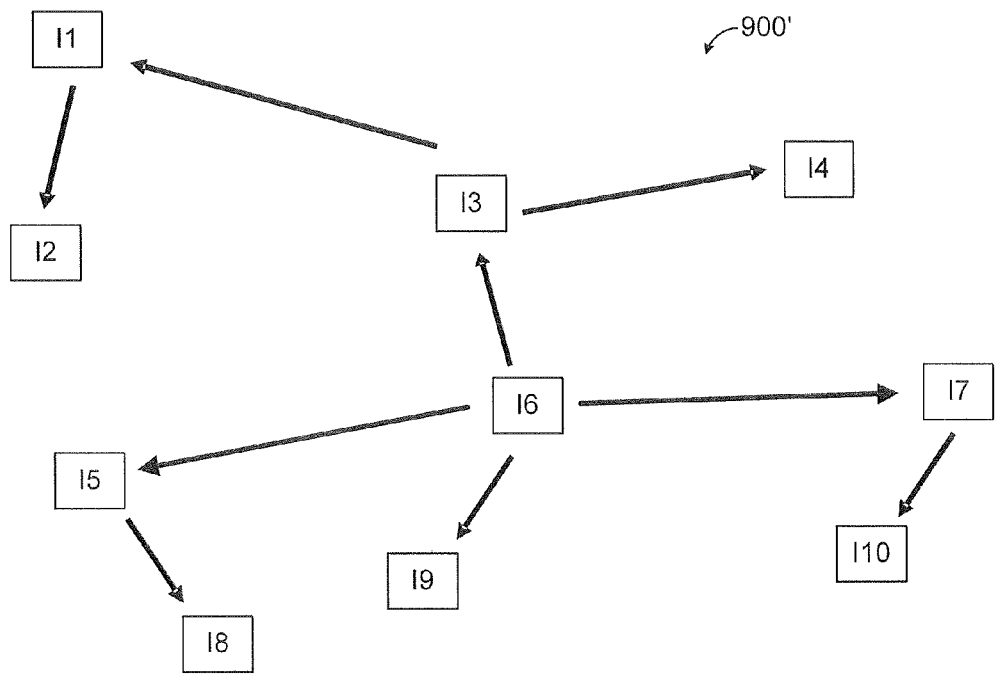
Figure 9D:
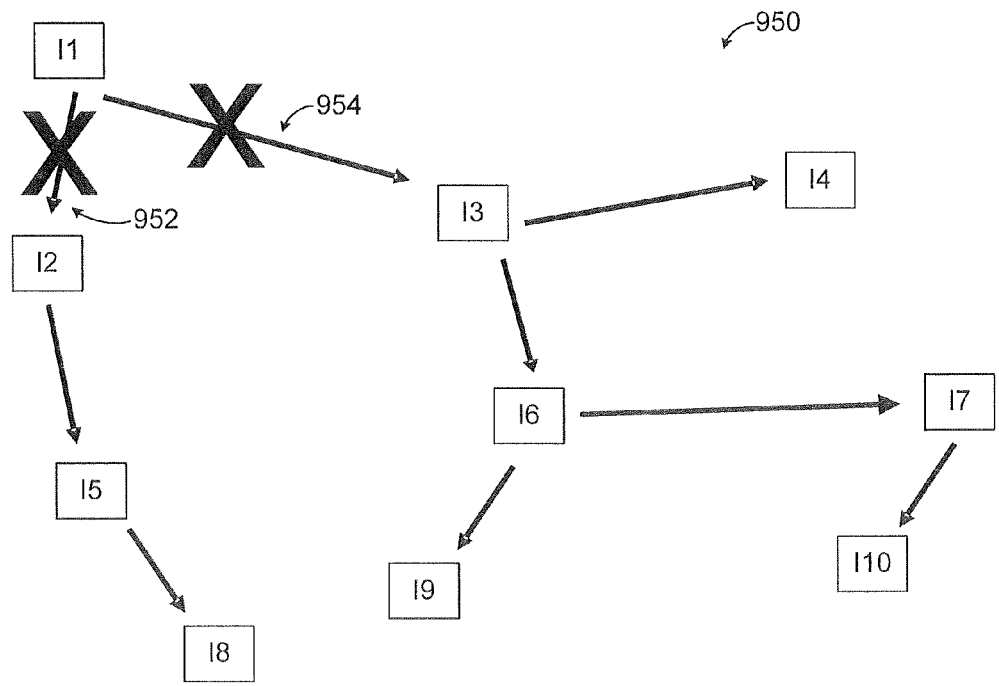

Although FIGS. 9A through 9D illustrate examples of recovery and cluster modification mechanisms for wireless network nodes, various changes may be made to FIGS. 9A through 9D. For example, a node could lose access to its master and use its backup master as shown in FIG. 9A without requiring a cluster pivot as shown in FIGS. 9B and 9C. Similarly, a cluster pivot as shown in FIGS. 9B and 9C could occur at any suitable time and is not limited to situations where a node loses access to its master.

FIGS. 10A through 15B illustrate an example cluster merge mechanism for wireless network nodes according to this disclosure. The details of the cluster merge mechanism shown in FIGS. 10A through 15B are for illustration only. Other cluster merge mechanisms could be used without departing from the scope of this disclosure.

Various clusters of wireless nodes can sometimes overlap, which could be due to changes in wireless network topology, the dynamic nature of wireless links, or other causes. For example, infrastructure nodes in two different clusters could provide wireless coverage to the same physical area. When this occurs, it may be necessary or desirable to merge the clusters into a single larger cluster. This process is referred to as a "cluster merge." Cluster merges could be initiated in any suitable manner, such as in response to user input or automatically (like when a node in one cluster detects a node in another cluster).

Figure 10A:
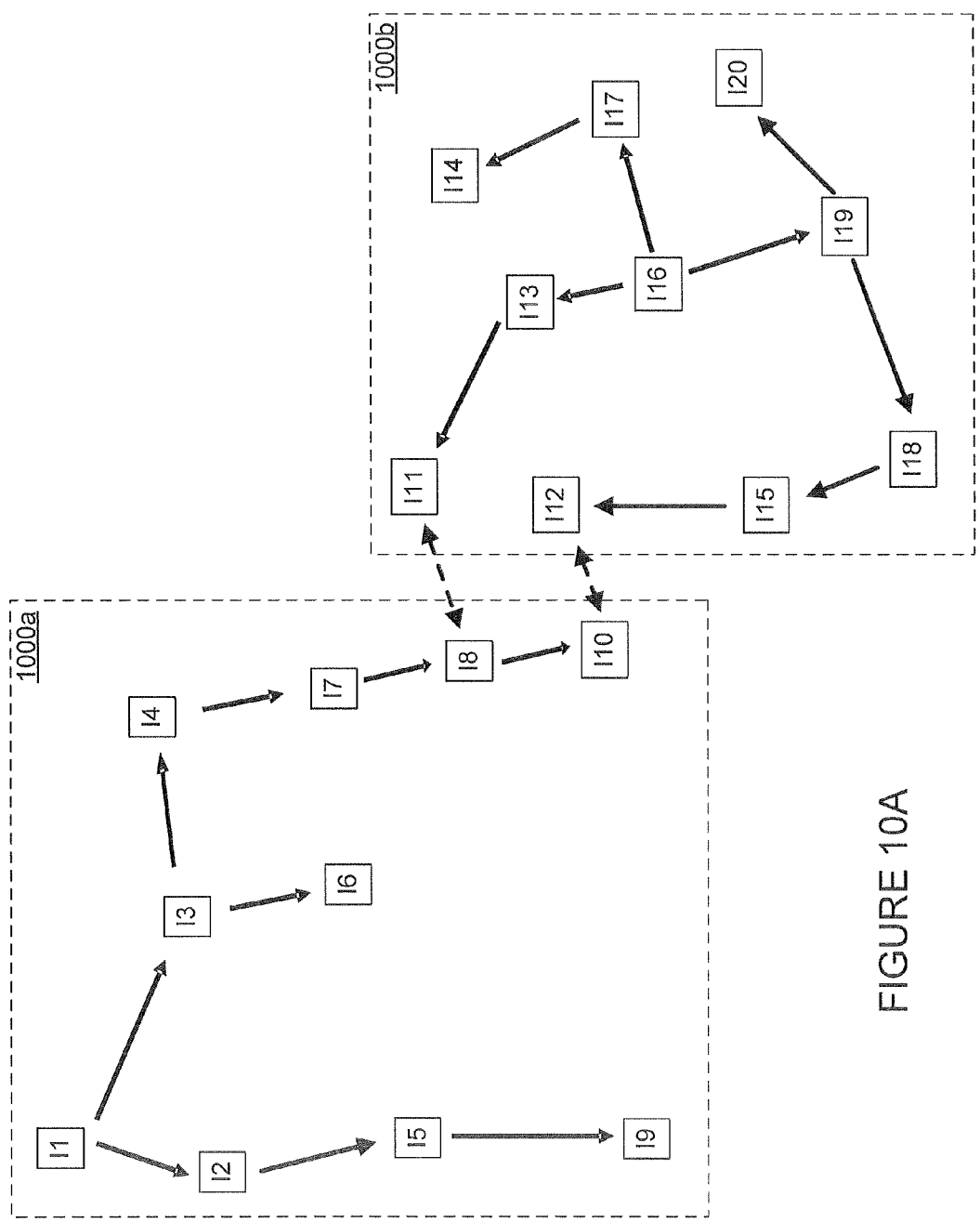
FIGS. 10A through 15B illustrate an example cluster merge mechanism for wireless network nodes according to this disclosure.

Take, for instance, the example shown in FIG. 10A. Here, a cluster 1000a includes infrastructure nodes I1-I10, and a cluster 1000b includes infrastructure nodes I11-I20. As can be seen, nodes I8 and I11 may communicate with one another, and nodes I10 and I12 may communicate with one another. These nodes I8 and I10-I12 are referred to as "connecting nodes" since they are the nodes detecting a connection between two clusters 1000a-1000b. Each of the connecting nodes may inform the time synchronization manager 122 that it has detected another cluster. The time synchronization manager 122 can determine whether to initiate a merge of the clusters 1000a-1000b and, if so, how to perform the cluster merge. In particular embodiments, no cluster mergers can be initiated for either cluster until a currently active cluster merge process has completed.

Figure 10B:
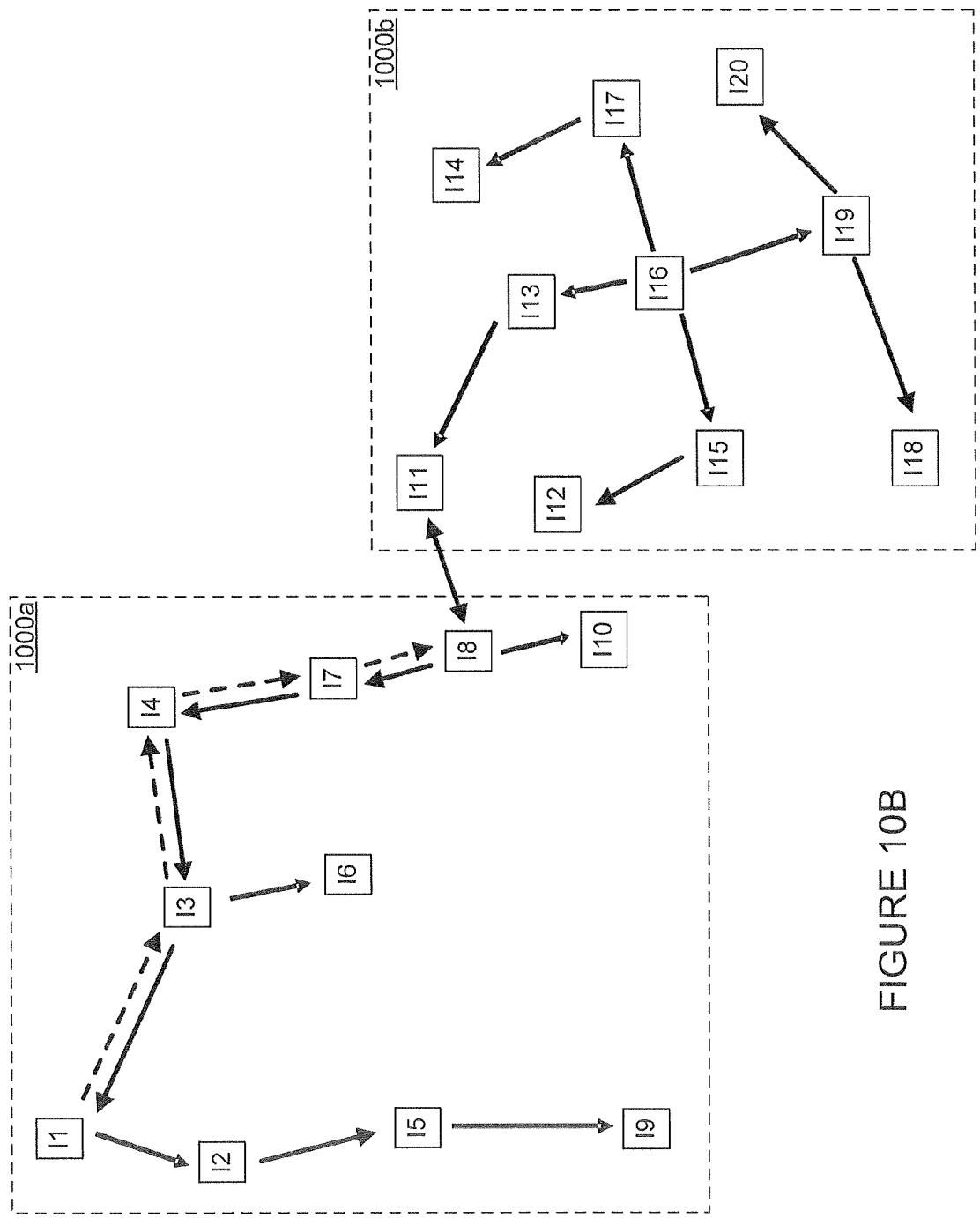
Figure 10C:
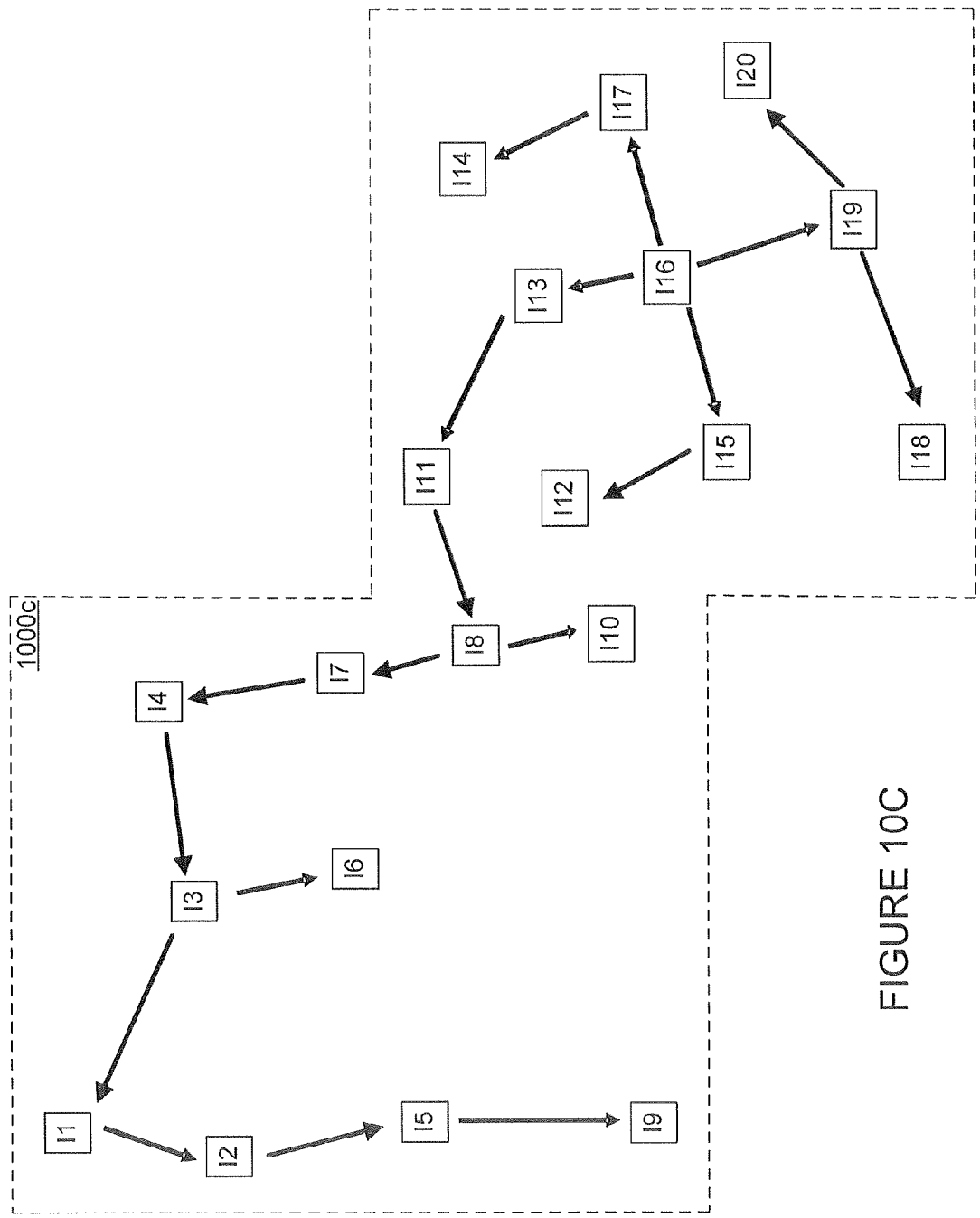

In this example, there are four connecting nodes, and the time synchronization manager 122 could select the link between nodes I8 and I11 as the basis for the merge. One of these nodes (in this case, node I8) is then made the cluster master of its cluster as shown in FIG. 10B. By selecting node I8 (as opposed to node I11) to be the master of its cluster, the time synchronization manager 122 has also determined that cluster 1000a will shift its time to that of cluster 1000b (since the two clusters likely have different senses of time). Making node I8 the cluster master occurs by reversing the flow of time synchronization information between the current cluster master (node I1) and the new cluster master (node I8). The new cluster master can then take steps to help synchronize the nodes I1-I10 in cluster 1000a with the time of the other cluster 1000b. This is described in more detail below. Once this is complete, the nodes in cluster 1000a are time-shifted to synchronize with node I11. The two clusters can then be merged into one cluster by making node I11 act as the master of node I8 (as shown in FIG. 10C). This merges the nodes I1-I20 into a single cluster 1000c. Note that the time-shift may occur gradually or in a jump correction depending on the needs of the application.

Figure 10D:
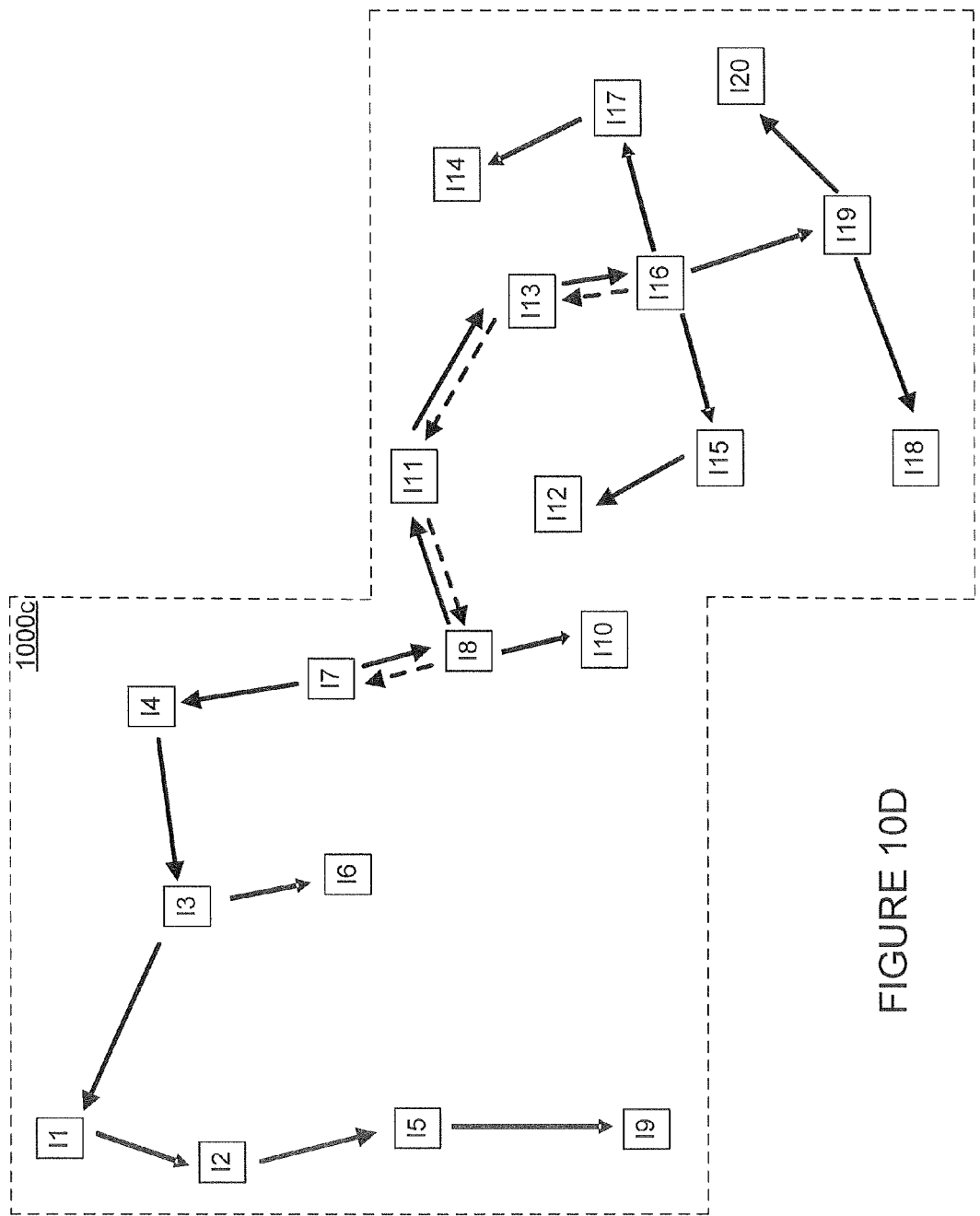

At this point, a decision can be made whether to pivot the cluster 1000c so that the cluster master is placed in a more appropriate location. In this example, node I7 may make a more suitable cluster master than the current cluster master (node I16). This is due to the long path from node I16 to node I9 in cluster 1000c. As a result, the flow of time synchronization information between the existing cluster master (node I16) and the new cluster master (node I7) is reversed as shown in FIG. 10D. This makes node I7 the new cluster master of the combined cluster 1000c.

Figure 11:
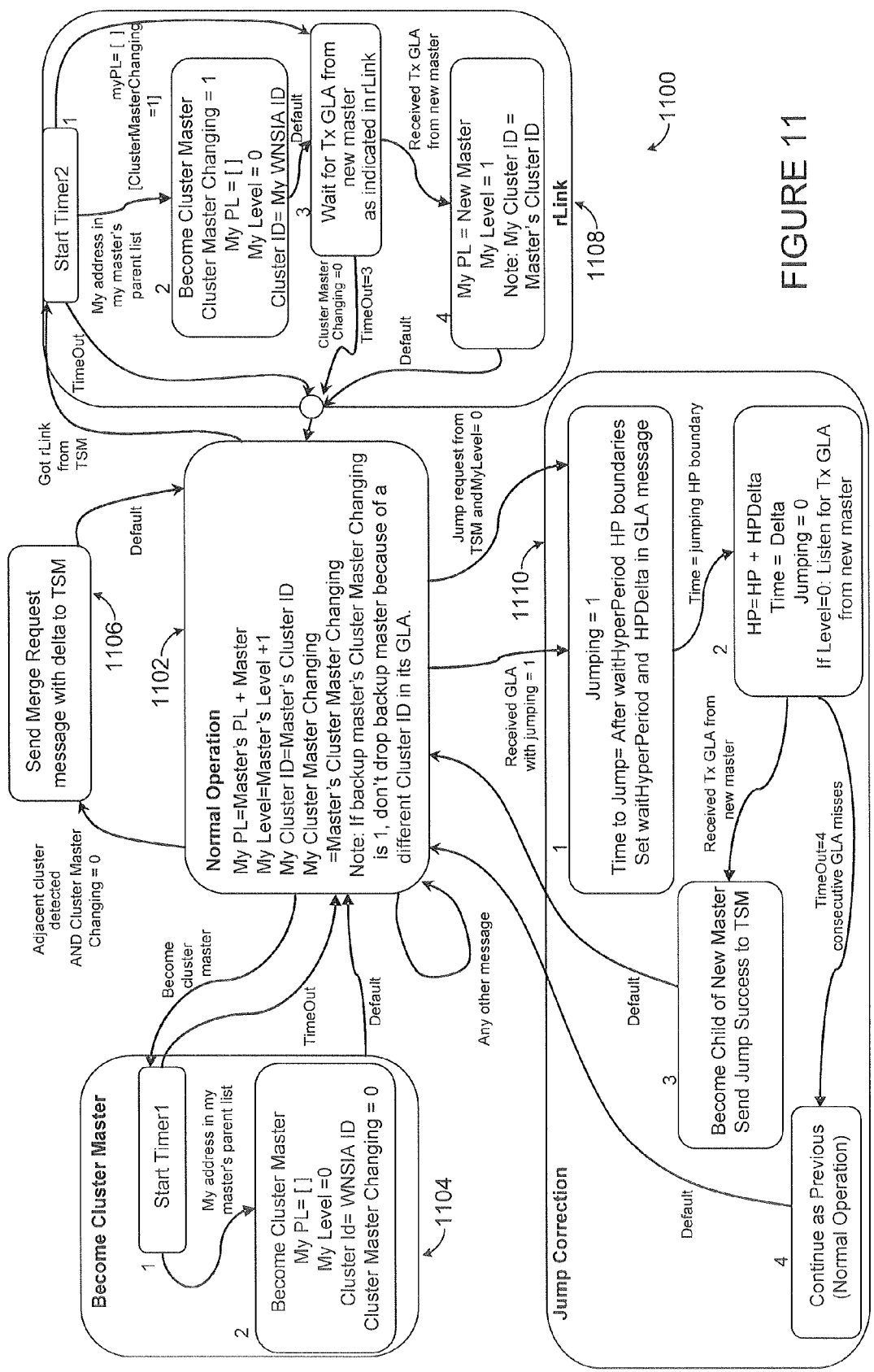

FIG. 11 illustrates a state diagram 1100 describing the time synchronization behavior for the infrastructure nodes in a wireless network. In this example, an infrastructure node may normally operate in state 1102. Assume that the infrastructure node initially is not acting as a cluster master. In this state 1102, the infrastructure node's parent list ("My PL") equals the parent list of its master, plus the master itself. Also, the infrastructure node's cluster level ("My Level") equals the cluster level of its master plus one. Further, a cluster identifier ("My Cluster ID") and a flag indicating whether the cluster master is changing ("My Cluster Master Changing") in the infrastructure node equal respective values in its master.

The infrastructure node can transition to a "become cluster master" state 1104, such as when the time synchronization manager 122 wishes for the infrastructure node to become a cluster master to facilitate a cluster merge. In this state 1104, a timer can be started in substrate 1 to define a period in which the infrastructure node can become the cluster master (such as a period of two hyperperiods). If the timer expires without necessary conditions being met, the infrastructure node returns to state 1102 (without having become a cluster master). Otherwise, if the necessary conditions are met (such as a determination that the infrastructure node is a parent to its current master), the infrastructure node becomes a cluster master in substrate 2. Here, the infrastructure node clears its parent list, sets its level to zero, initializes its cluster identifier (such as to its unique network identifier), and clears its cluster master changing flag. It could also clear a backup master list.

The infrastructure node can also transition to a state 1106 when a node in another cluster is detected. This transition may require that no cluster master change is occurring. In this state 1106, the infrastructure node informs the time synchronization manager (TSM) 122 of its detection of the other cluster. The infrastructure node can also inform the time synchronization manager 122 of a time delta or time difference between the two clusters. The infrastructure node can then transition back to state 1102. It is then up to the time synchronization manager 122 to determine whether a cluster merge is initiated.

The infrastructure node can further transition to a "reverse link" (rLink) state 1108 when an rLink request is received. The rLink request causes the infrastructure node at some point to reverse the flow of time synchronization information with a neighboring node, such as when a cluster master is being moved. In this case, a second timer is started in substrate 1. If the timer expires without necessary conditions being met, the infrastructure node returns to state 1102 without reversing the link. Otherwise, if the infrastructure node is to become a cluster master due to the link reversal, the proper settings are cleared and set in the infrastructure node during substrate 2. If the infrastructure node is not to become a cluster master (or once substrate 2 is complete), the infrastructure node waits for a transmit (Tx) GLA message from its new master in substrate 3. If it does not receive one, a timeout occurs, the cluster master changing flag is cleared, and the infrastructure node returns to state 1102. If a transmit GLA message is received from the infrastructure node's new master (and if the infrastructure node does not appear in the parent list of its new master), the infrastructure node updates its information during substrate 4. Once substrate 4 is complete, the infrastructure node transitions back to state 1102. During this transition, the new master of the infrastructure node is not dropped even if its change cluster master bit is set (as long as the nodes in the new master's parent list have a cleared change cluster master bit).

The infrastructure node can also transition to a "jump correction" state 1110. The jump correction refers to a change in the infrastructure node's time when the node is being merged into a cluster with a different measure of time. Here, substrate 1 can be entered when a cluster master receives a jump request from the time synchronization manager 122 or when a GLA message with a jumping flag is received. In either case, the infrastructure node sets its jumping flag and determines a jump time. The jump time can be based on a waitHyperPeriod value, which identifies the number of hyperperiods that should pass before the jump occurs. The waitHyperPeriod value and an HPDelta value (the difference between the infrastructure node's current hyperperiod boundary and another cluster's hyperperiod boundary) are set in the infrastructure node's GLA message, which can be broadcast during the infrastructure node's transmit GLA slot.

Once the current time reaches the boundary of the hyperperiod where the jump occurs, the infrastructure node transitions to substrate 2, where the hyperperiod is adjusted and the current time is set to equal the delta value. This adjusts the time of the infrastructure node in one single jump or change, and the jumping flag is cleared. If the infrastructure node is a cluster master, it also listens for a transmit GLA message from a new master (in the cluster into which the node is being merged). If a GLA message is received, the infrastructure node becomes a child of the new master and notifies the time synchronization manager 122 that the jump is complete in substrate 3. Otherwise, the infrastructure node moves to substrate 4 and continues with normal operation (and it remains the cluster master of an unmerged cluster).

Figure 12:
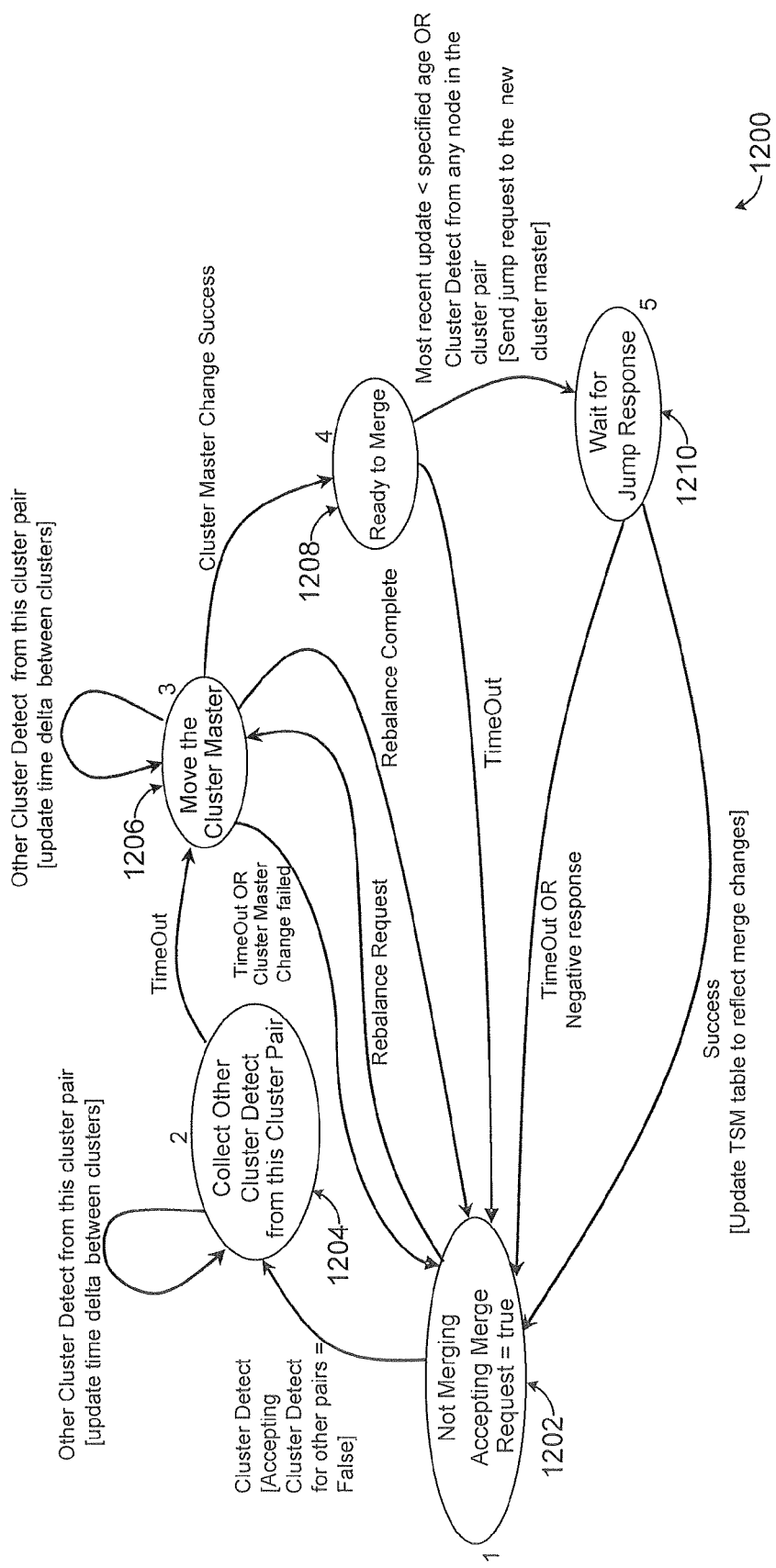

FIG. 12 illustrates a state diagram 1200 of the time synchronization manager 122 during cluster merges. Here, the time synchronization manager 122 may initially be in state 1202, where no merges are occurring and an "accept merge request" flag is set to true. This indicates that the time synchronization manager 122 is willing to accept merge requests for clusters. When a "cluster detect" message is received, this indicates that a node in one cluster has detected another cluster. In this case, the time synchronization manager 122 may set the "accept merge request" flag to false and transition to state 1204.

In state 1204, the time synchronization manager 122 waits to see if other "cluster detect" messages are received from nodes in the same pair of clusters. This allows the time synchronization manager 122 to identify various links between the two clusters. It also allows the time synchronization manager 122 to identify the time difference between the two clusters.

After a specified time period (such as 30 seconds), the time synchronization manager 122 transitions to state 1206. State 1206 can also be entered directly from state 1202 when a request to rebalance a cluster is received. Rebalancing a cluster involves moving the cluster master to reduce the number of levels in a cluster. In state 1206, the time synchronization manager 122 attempts to move the cluster master in a cluster. The cluster could represent one of the clusters involved in a merge or the cluster being rebalanced. In either case, the time synchronization manager 122 sends rLink messages to appropriate nodes and continues collecting data regarding the time difference between clusters. Also, no updates could be processed or used in state 1206.

If a timeout (such as two hyperiods) occurs, a cluster master change fails, or a rebalance request succeeds, the time synchronization manager 122 returns to state 1202. Otherwise, the cluster master change succeeds, and the time synchronization manager 122 enters state 1208. In state 1208, the time synchronization manager 122 is ready to initiate a merge of two clusters. If a timeout occurs (such as after 15 minutes), the time synchronization manager 122 returns to state 1202 without completing the cluster merge. The time synchronization manager 122 is waiting here to receive an update on the time difference between the two clusters being merged.

If an update is less than a specified amount of time in age (such as five seconds) or if another "cluster detect" message is received with a time delta value, the time synchronization manager 122 enters state 1210 and triggers the cluster merge. The cluster merge is initiated by instructing the cluster master of the cluster being merged into another cluster to jump time. If a timeout (such as four hyperiods) occurs or the jump is not successful, the time synchronization manager 122 returns to state 1202, and the cluster merge is not completed. If the jump is successful, the time synchronization manager 122 has successfully synchronized the nodes in the two clusters. As long as the cluster master in one cluster becomes the child of any node in the other cluster, the two clusters are successfully merged. The time synchronization manager 122 can therefore update its internal tables or other data structures with the merge results and return to state 1202. Note that the time-shifting to achieve synchronization between the two clusters could occur gradually or as a jump correction depending on the application requirements.

Figure 13:
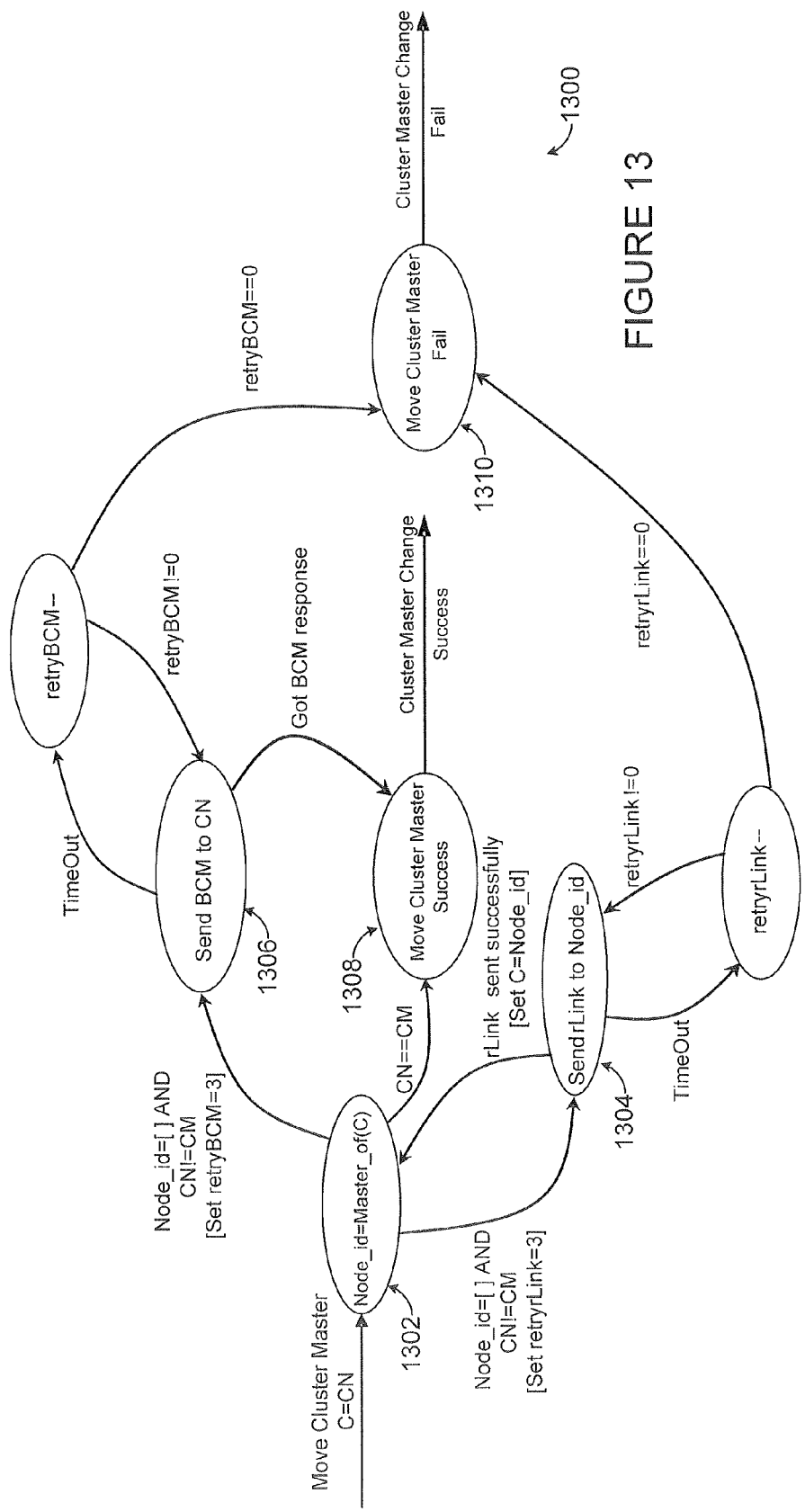

FIG. 13 illustrates a state diagram 1300 of the time synchronization manager 122 during a cluster master change operation for a cluster. The objective of this operation is to move the cluster master so that the connecting node becomes the new cluster master. Once this condition has been met, the cluster may correct its time to that of an adjacent cluster and merge with the adjacent cluster. Here, the time synchronization manager 122 may initially enter state 1302, where the synchronization manager 122 attempts to make a connecting node (CN) the cluster master of its cluster. In state 1302, the synchronization manager 122 identifies the master of a node C, which is initially set to the connecting node. The master of node C is denoted Node_id. If the connecting node is the cluster master, the time synchronization manager 122 transitions to state 1308, where the cluster master change is successful.

If the Master_of function returns a non-NULL value (indicating that node C is a child of another node) and the connecting node is not the cluster master, the time synchronization manager 122 transitions to state 1304 and sets a retryrlink value to an initial value (such as three). In state 1304, the time synchronization manager 122 sends an rLink request to node Node_id, which was identified using the Master_of function. If the rLink request is successful, the time synchronization manager 122 sets node C equal to Node_id and returns to step 1302 (to update the value of Node_id and repeat the process). If the rLink request is not successful, the retryrlink value is decremented, and the time synchronization manager 122 can reenter state 1304 or transition to state 1310. If the time synchronization manager 122 reenters state 1304, the time synchronization manager 122 can again transmit an rLink message. If the time synchronization manager 122 enters state 1310, the move cluster master operation fails.

If the Master_of function returns a NULL value but the connecting node is still not the cluster master, the time synchronization manager 122 transitions to state 1306 and sets a retryBCM value to an initial value (such as three). "BCM" refers to "become cluster master," and state 1306 involves sending a become cluster master request to the connecting node. This request causes the connecting node to begin operating as a cluster master. If the request is not successful, the retryBCM value is decremented, and the time synchronization manager 122 can reenter state 1306 or transition to state 1310. If the time synchronization manager 122 reenters state 1306, the time synchronization manager 122 can again attempt to cause the connecting node to become the cluster master. If the time synchronization manager 122 enters state 1310, the move cluster master operation fails. If the request is successful, the time synchronization manager 122 transitions to state 1308.

Figure 14:
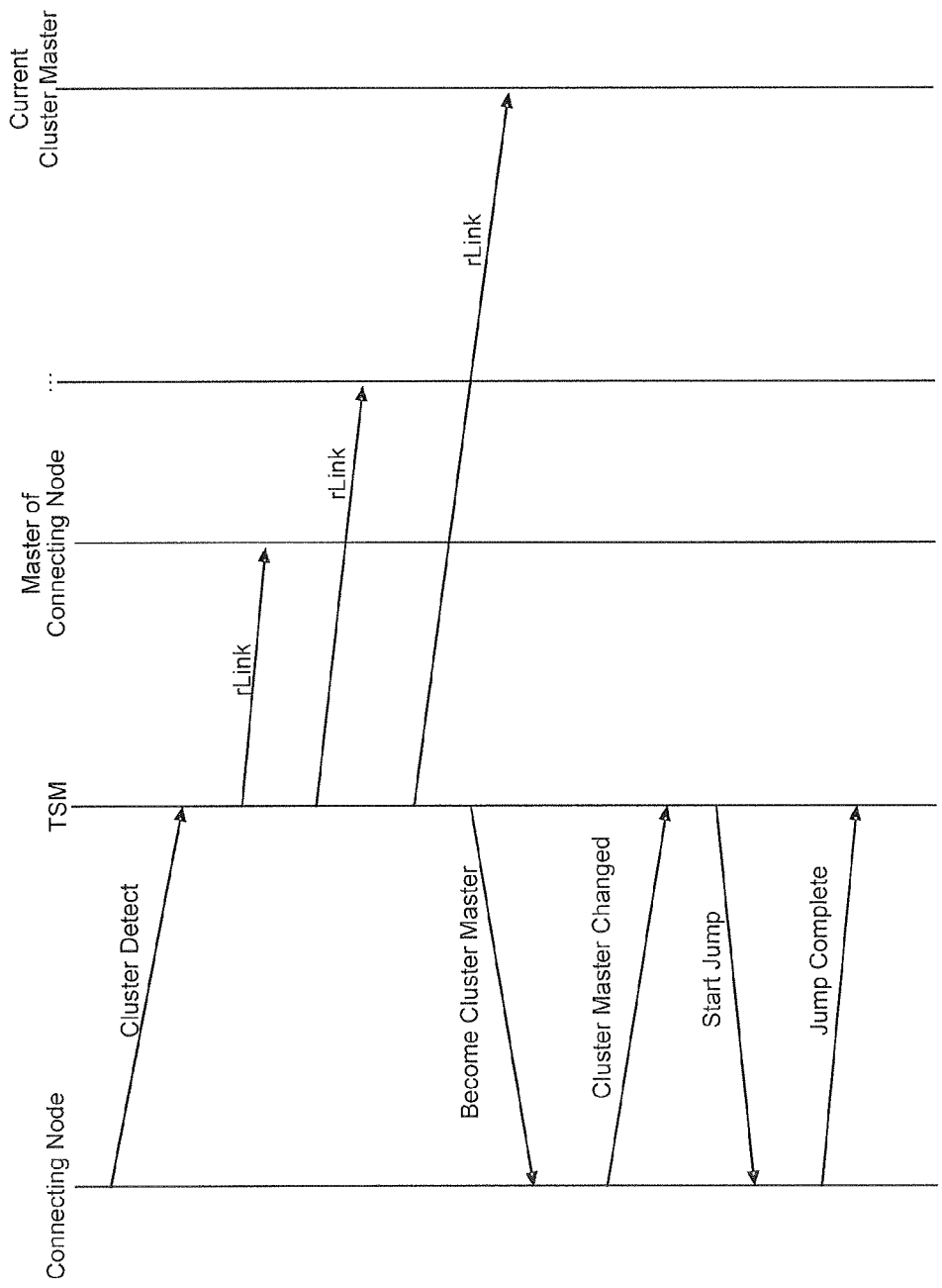

FIG. 14 illustrates an example message flow that can occur during a cluster merge. As shown here, a connecting node that detects another cluster sends a cluster detect message to the time synchronization manager 122. The time synchronization manager 122 can send rLink messages to the master of the connecting node, the connecting node's current cluster master, and any nodes between the master of the connecting node and the current cluster master. The time synchronization manager 122 can also send a become cluster master request to the connecting node, which can respond with a cluster master changed message. The time synchronization manager 122 can further provide a start jump command to the connecting node, which causes the connecting node (the new cluster master) to adjust its time to the time of another cluster. The connecting node can respond with a jump complete message when the time jump is finished, indicating that the connecting node has adjusted its time.

Figure 15A:
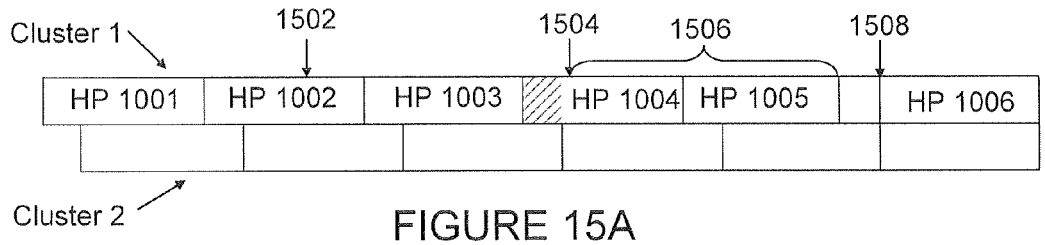
Figure 15B:
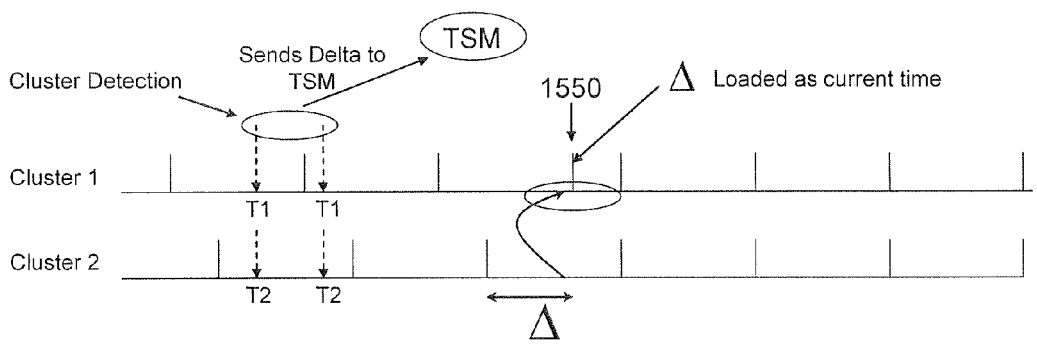

FIGS. 15A and 15B illustrate two ways in which the time of one cluster can be adjusted to the time of the other cluster. The cluster that is shifting its time may perform the shift either at a hyperiod boundary of an adjacent cluster (FIG. 15A) or at one of its hyperiod boundaries (FIG. 15B). In FIG. 15A, a first cluster ("Cluster 1") detects an adjacent cluster ("Cluster 2") at time 1502. At time 1504, a time difference between the two clusters is measured (the time difference represents the difference in hyperiod boundaries). During time 1506, the time of a jump is propagated through the nodes of the first cluster, along with the identity of the hyperiod when the jump occurs (HP1006 in this example). At the indicated hyperiod number, slot number, and crystal ticks (time 1508), the nodes in the first cluster rewind their clocks to the beginning of that hyperiod. At this point, the nodes in the two clusters have been synchronized. This jump can be called a "jump to boundary" operation since the nodes in a cluster are changing their times to a hyperiod boundary.

In FIG. 15B, a jump called a "jump at boundary" operation is used. Here, the nodes in a cluster perform a time jump at the boundary of a hyperiod. As shown in FIG. 15B, a first cluster detects an adjacent cluster, such as by detecting GLA or data acknowledgement messages. A connecting node in the first cluster can measure the difference in time between the two clusters and report a delta value ($\Delta$) to the time synchronization manager 122. Here, $\Delta=T2-T1$ if $T2>T1$ or $\Delta=HP+T2-T1$ if $T2<T1$. Ti represents the number of system ticks that have occurred since the start of the current hyperiod. With the structure of the frame 400 shown in FIG. 4, Ti=SlotID*48+(1+SlotID/10)*32+(48−TicksLeft) during the operation subframe 404 and Ti=SlotID*48+(SlotID/10)*32+(32−TicksLeft) during the discovery subframe 402. The "SlotID" value and the "TicksLeft" value may vary depending on whether the subframe 402 or 404 is currently occurring. For example, if TicksInFrame equals Δ% 512 and is less than 32, the discovery subframe 402 is occurring, SlotId=#Frames*10, and TicksLeft=32−TicksInFrame (where #Frames=Δ/512). If TicksInFrame equals Δ%512 and is greater than or equal to 32, the operation subframe 404 is occurring, SlotId=(TicksInFrame−32)/48+#Frames*10, and TicksLeft=48−(TicksInFrame−32)% 48. The "HP" value denotes the number of ticks in a hyperperiod and could equal 1200*48+120*32, and the number of ticks per frame could equal 512 (32 for the DSF 402 and 48 for each of the 10 slots 406 of the OSF 404).

The connecting node in the first cluster can calculate the delta value and report it to the time synchronization manager 122. At time 1550 (which represents a hyperperiod boundary), the nodes in the first cluster set their current time equal to the delta value. In effect, rather than starting a hyperperiod at time T=0, the nodes in the first cluster are pushed ahead and start the hyperperiod at time T=Δ. This shortens the hyperperiod so that the nodes in both clusters are synchronized at the end of the first cluster's shortened hyperperiod.

The messages used during a cluster merge could have any suitable format. For example, updates can be periodically sent to the time synchronization manager 122, such as every five minutes and could have the form:

```
typedef struct UPDATE_PKT {
    uint16  master_id;       // Identity of node's master
    uint8   tx_gla_slot;     // Identity of node's GLA transmit slot
    uint16  cluster_id;      // Cluster in which node resides
    uint8   level;           // Cluster level of node in cluster
    uint16  initial_phase;   // Phase difference of node with master
} UPDATE_PKT;
```

A "cluster detect" message sent to the time synchronization manager 122 when a node detects another cluster could have the form:

```
typedef Struct CLUSTER_DETECT {
    uint16 my_cluster_id;       // Cluster ID of detecting node
    uint16 detected_node_id;    // Identifier of node in other cluster
    uint16 detected_cluster_id; // Identifier of other cluster
    uint16 time_delta           // Time offset to reach the next hyperperiod
                                // boundary of the detected cluster in crystal ticks
    int8   hpDelta              // Difference in hyperperiods between clusters
} CLUSTER_DETECT
```

An rLink message could have the form:

```
typedef struct RLINK {
    uint16 new_master_id;              // Identity of new master for node
    uint8  tx_gla_slot_of_new_master;  // New master's Tx GLA slot
    uint16 initial_phase;
} RLINK;
```

A cluster master change status message can be sent to indicate whether a cluster master has been changed successfully. This message could have the form:

```
typedef struct CM_CHANGE_STATUS {
    uint8 status } CM_CHANGE_STATUS
```

A start jump message for initiating a time jump in a cluster could have the form:

```
typedef struct START_JUMP {
    uint16 detected_node_id;  // Node to perform jump
    uint16 new_cluster_id;    // New cluster ID for node performing jump
    uint16 time_delta;        // Time that the jumping cluster will set at
                              // the beginning of its hyperperiod boundary (in crystal ticks)
    int8   hpDelta;           // Add to current HP and use as HP after jump
    uint8  tx_gla_slot;       // Tx GLA slot of new master
    uint16 initial_phase;
    uint8  hpWait             //# of HPs to wait before jumping.   With maximum
                              // cluster level of 9, this can be set as 3 hyperperiods
} START_JUMP;
```

The status of the time jump can be reported using a jump complete status message, which could have the form:

```
typedef struct JUMP_COMPLETE_STATUS{
    uint8 status } JUMP_COMPLETE_STATUS;
```

Although FIGS. 10A through 15B illustrate one example of a cluster merge mechanism for wireless network nodes, various changes may be made to FIGS. 10A through 15B. For example, any suitable clusters could be merged together. Also, the state diagrams shown in FIGS. 11 through 13 are for illustration only, and the messages exchanged in FIG. 14 are for illustration only. In addition, both techniques shown in FIGS. 15A and 15B involve a rapid time jump (one single jump operation). The time jump could also occur more gradually. As a particular example, the process in either FIG. 15A or 15B could occur multiple times, such as when four different jumps are implemented (each involving ¼ of the total jump time).

FIGS. 16 through 24B illustrate example methods for time synchronization in a wireless network according to this disclosure. The embodiments of the methods shown in FIGS. 16 through 24B are for illustration only. Other methods for time synchronization could be used without departing from the scope of this disclosure.

Figure 16:
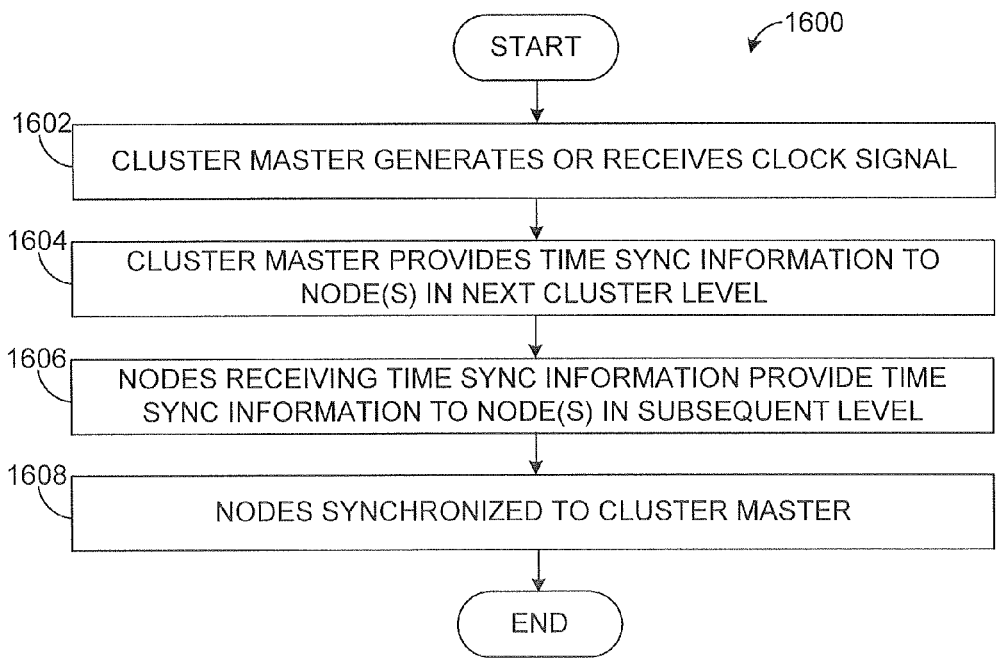
FIGS. 16 through 24B illustrate example methods for time synchronization in a wireless network according to this disclosure.

In FIG. 16, a method 1600 defines a high-level synchronization process in a cluster. A cluster master generates its own clock or receives a clock signal (such as from a source outside of the cluster) at step 1602. This could include the wireless node 302 in the cluster 300 receiving a clock signal from an external source or internally generating a clock signal. The cluster master provides time synchronization information to one or more nodes in the next cluster level at step 1604. This could include the wireless node 302 broadcasting information defining an absolute time to nodes 304a-304c in "level 1" of the cluster. The nodes receiving the time synchronization information similarly broadcast the synchronization information to any nodes in the next cluster level at step 1606. This could include the wireless nodes 304a-304c broadcasting information defining an absolute time to nodes 306a-306d in "level 2" of the cluster and the nodes 306a-306d broadcasting the information to nodes 308a-308b in "level 3" of the cluster. In effect, each cluster level sends time synchronization information to the next cluster level. Each node receiving the time synchronization information can adjust its internal clock using the synchronization information, and at step 1608 all nodes in the cluster are substantially synchronized with the cluster master.

Figure 17:
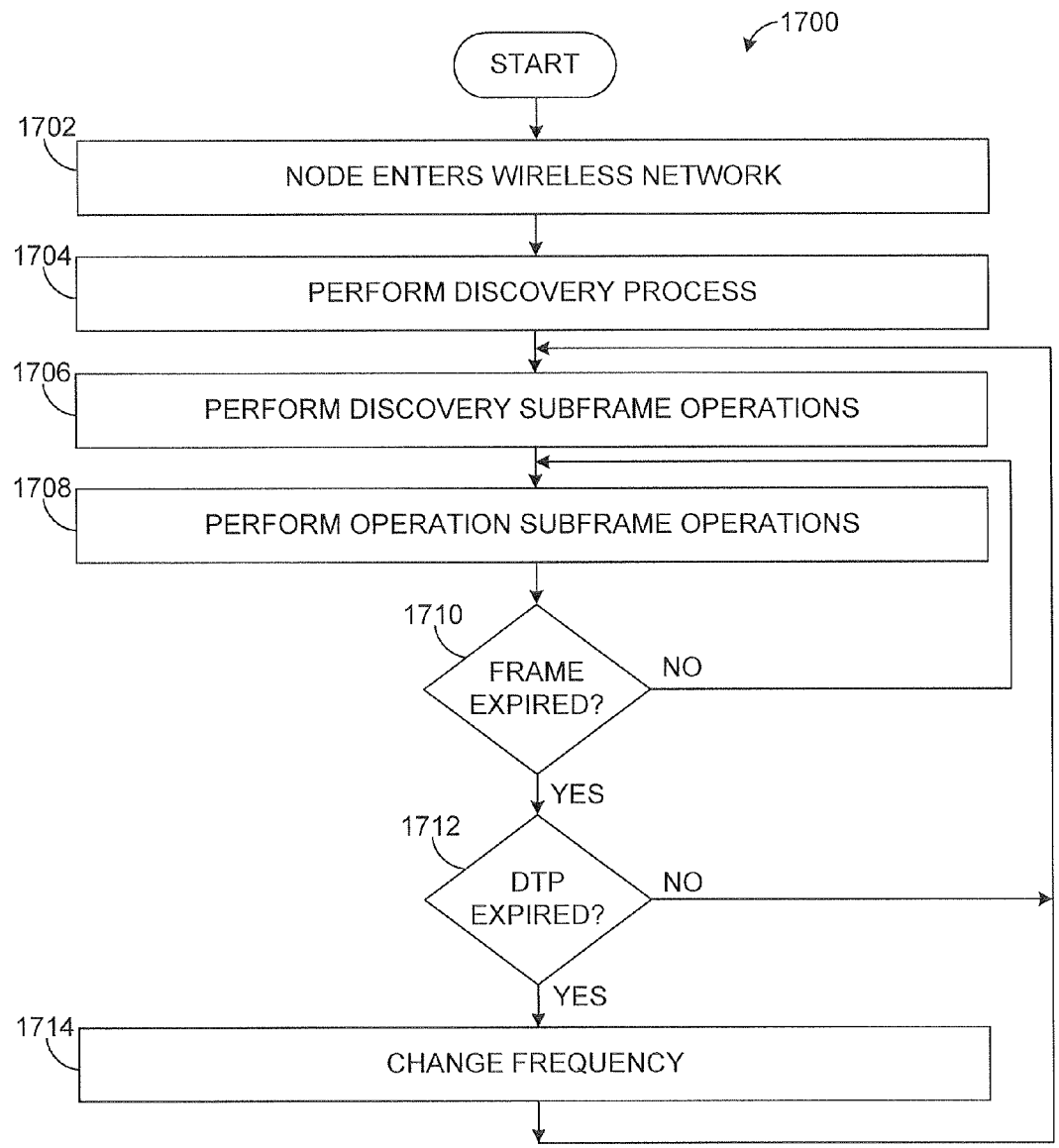
Figure 18:
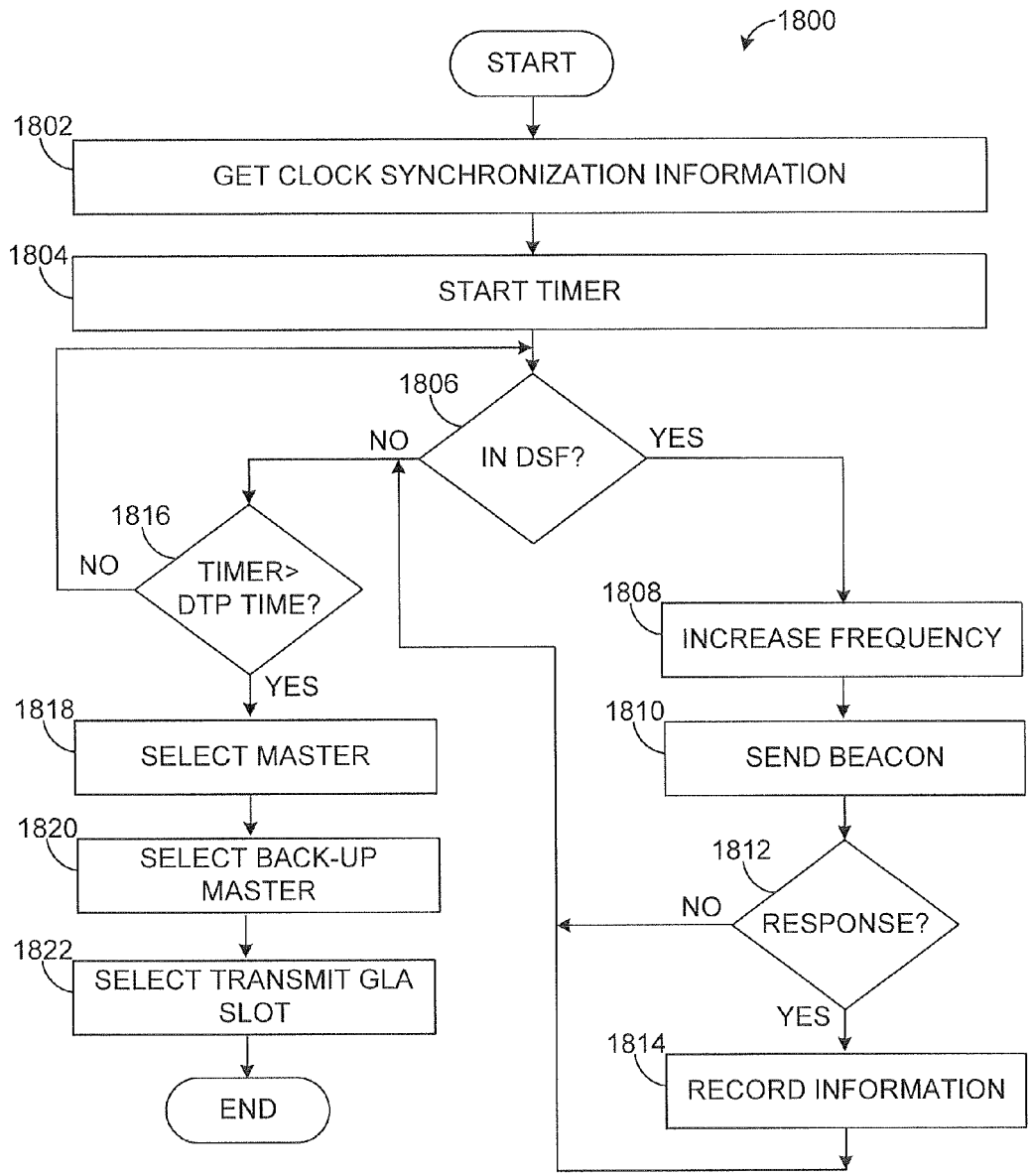
Figure 19A:
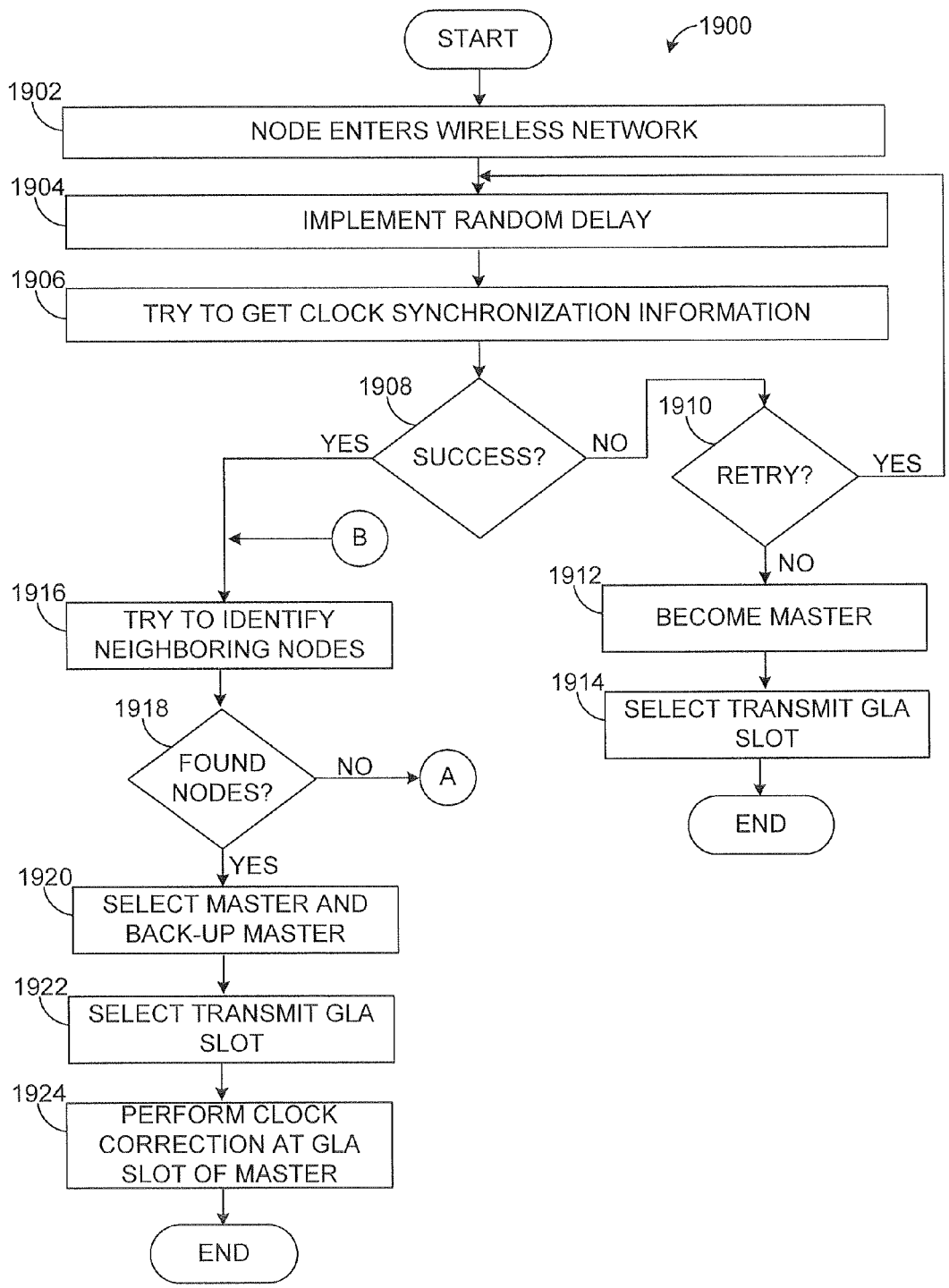
Figure 19B:
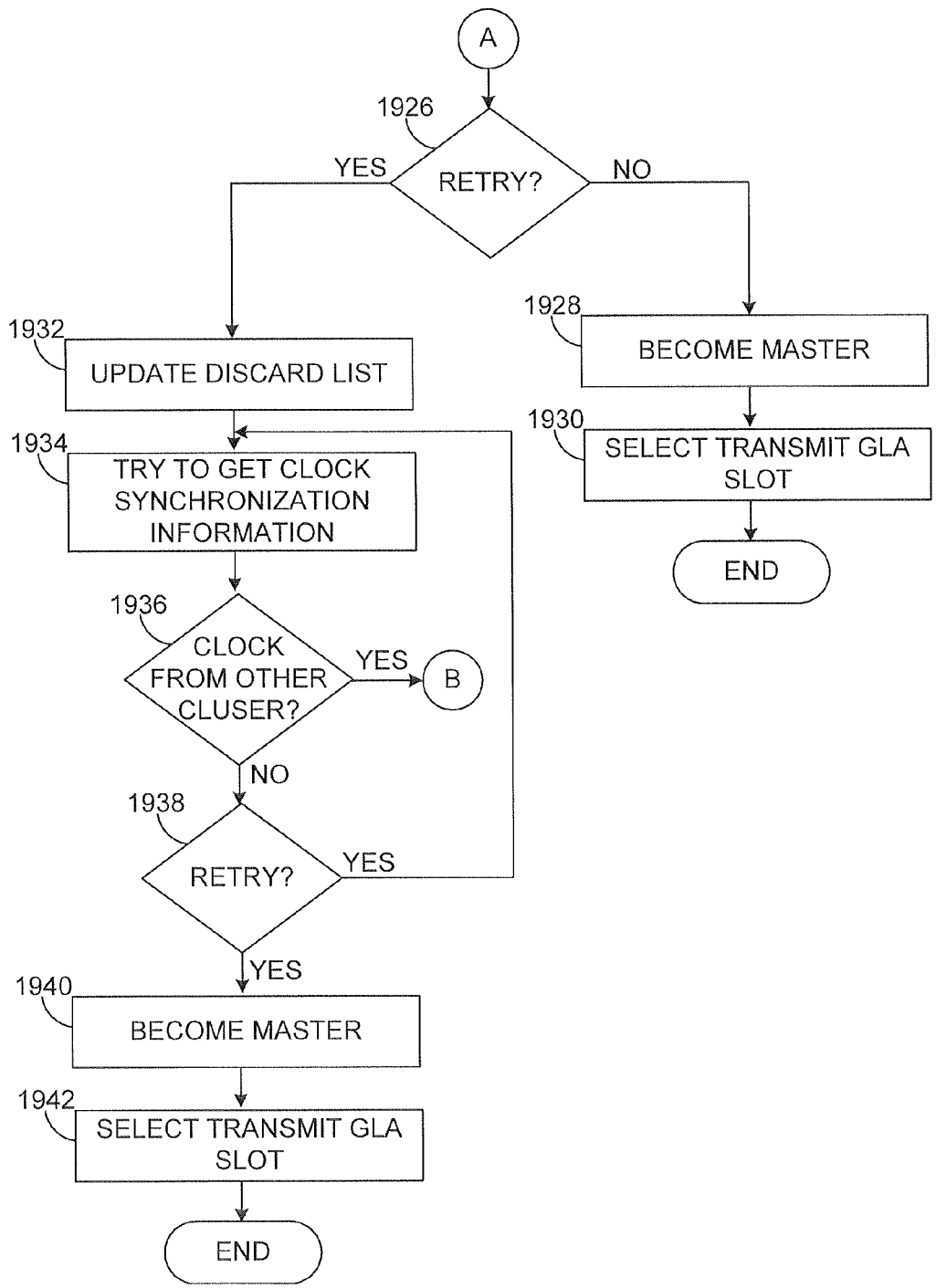
Figure 20:
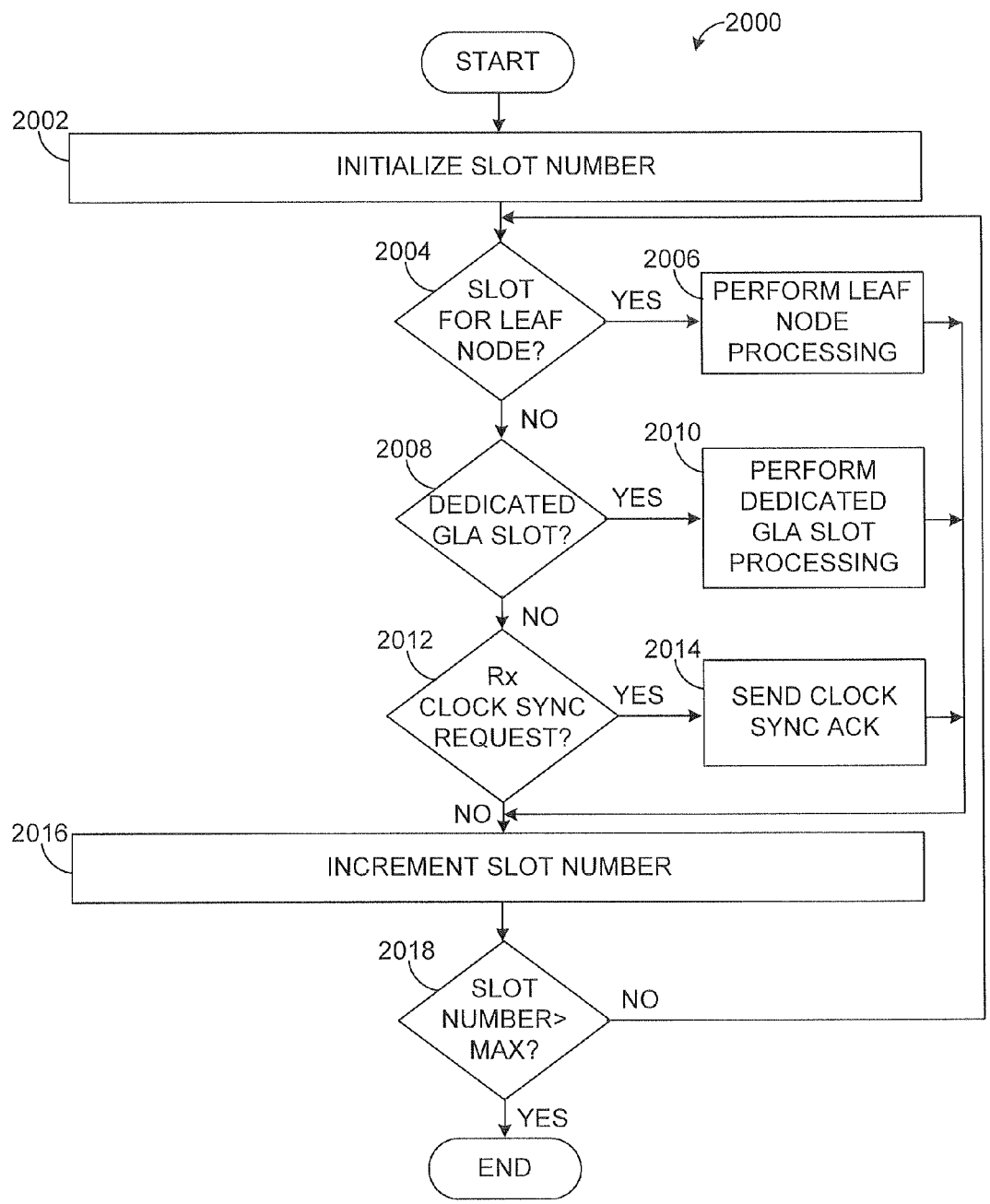

In FIG. 17, a method 1700 defines a high-level operation of a node in a cluster. A node enters a wireless network at step 1702. This could occur when a node is brought online in the wireless network or after the node suffers a power loss. The node performs discovery operations at step 1704, examples of which are shown in FIGS. 18 and 19A-19B. The node then performs, during a single frame, DSF operations at step 1706 and OSF operations at step 1708. Example OSF operations are shown in FIG. 20. As long as the frame has not expired at step 1710, the OSF operations continue. When the frame expires at step 1710, a determination is made whether the discovery time period has expired at step 1712. If not, another frame begins, and the method 1700 returns to step 1706. If the discovery time period has expired, the frequency used for discovery by the node changes, and the method 1700 returns to step 1706. In this way, multiple hyperperiods may occur using a common discovery frequency during a discovery time period, after which a different frequency is used.

FIG. 18 illustrates an example method 1800 for performing discovery operations in a node. Clock synchronization information is received at step 1802, which could include the node listening for messages containing time synchronization information or sending out requests 504 and receiving a response (as shown in FIG. 5). Once clock synchronization information is received, the node can identify the boundaries between frames, and the node initiates a timer at step 1804.

The node then determines if the discovery subframe is currently occurring at step 1806. If so, the node changes to the next hopping frequency at step 1808, transmits an RSSI beacon message at step 1810, and determines if any response is received at step 1812. If a response is received, the node records information associated with a neighboring infrastructure node at step 1814. The information could include the RSSI, cluster identifier, cluster level, transmit GLA slot, and response slot.

The method 1800 then proceeds to step 1816, where a determination is made whether the timer exceeds the length of a discovery time period. If not, the method 1800 returns to step 1806. If so, the node selects its master at step 1818 and at least one backup master (if available) at step 1820. This could include examining the information recorded at step 1814 to identify the neighboring infrastructure node with the lowest cluster level (as long as the neighboring infrastructure node has at least a minimum RSSI value). The backup masters could represent other neighboring infrastructure nodes having at least a minimum RSSI value. At this point, the node (if it is an infrastructure node) selects a transmit GLA time slot at step 1822. The transmit GLA time slot is selected to not interfere with the transmit GLA time slots of the identified master or backup master(s).

FIGS. 19A and 19B illustrate another example method 1900 for performing discovery operations in a node. A node enters a wireless network at step 1902. This could include initializing a "retry count" value to zero and setting an orphan bit to zero. The node implements a random delay at step 1904. The random delay (such as 1-30 seconds) helps to ensure than multiple nodes coming online simultaneously (such as after a power failure) do not interfere with each other. The node tries to get clock synchronization information at step 1906. This could include transmitting clock sync messages continuously in the frequency hopping pattern used during a discovery subframe 402. The clock sync messages can continue until a first acknowledgement message with time synchronization information is received or until a specified number of clock sync messages have been sent (such as sixty). Acknowledgements from nodes in any cluster could be accepted here.

If no clock synchronization information (no acknowledgement) is received, a failure has occurred at step 1908, and a determination is made whether to retry at step 1910. This could include, for example, determining if the "retry count" value exceeds a threshold (such as three). If not, the "retry count" value is incremented, and the method 1900 returns to step 1904. Otherwise, the node becomes a cluster master at step 1912 and selects its own transmit GLA slot at step 1914. In this case, the node cannot join any clusters and starts its own cluster.

If clock synchronization information is received at step 1906, a success is identified at step 1908. The "retry count" value is reset to zero, and the node attempts to join the cluster in which the neighboring node that provided the clock synchronization information resides. The node attempts to obtain RSSI beacon acknowledgements from neighboring nodes at step 1916. This could include transmitting RSSI beacon messages during discovery subframes 402 and forming a list of infrastructure nodes that respond. The infrastructure nodes in the list could be those that meet threshold RSSI requirements and that have the same cluster identifier as the one contained in the clock sync acknowledgement. If at least one neighboring node is found at step 1918, a master and at least one backup master (if available) are selected at step 1920. The master could represent the neighboring node with the lowest cluster level or, if multiple neighboring nodes exist on the same level, the neighboring node with the highest RSSI value. A transmit GLA slot is selected at step 1922. The transmit GLA slot could be selected randomly (as long as it does not occur during the master and backup masters' transmit GLA slots). The transmit GLA slot could also be selected using a circular allocation of slots based on level (such as when slots 0-4 are assigned to "level 1" nodes and slots 5-9 are assigned to "level 2" nodes). Also, clock corrections are performed during the GLA slots of the node's master at step 1924.

If no neighboring nodes are found at step 1918, a decision is made whether to retry the attempt at step 1926 in FIG. 19B. This could include determining if the "retry count" value equals two. If no more retries occur, the node becomes a cluster master at step 1928 and selects a transmit GLA slot at step 1930. Otherwise, the node updates a discard list at step 1932. The discard list identifies cluster identifiers that cannot be joined. The node then attempts to obtain clock synchronization information from clusters not on the discard list at step 1934. Again, this could include transmitting clock sync messages until an acknowledgement is received from a cluster not in the discard list or until sixty messages are sent. This could also include incrementing the "retry count" value. If an acknowledgement is received at step 1936, the method returns to step 1916 to attempt to join the new cluster. Otherwise, a decision is made whether to continue trying at step 1938, such as by determining whether the "retry count" value is two. If no more retries are attempted, the node becomes a cluster master at step 1940 and selects a transmit GLA time slot at step 1942.

Figure 21A:
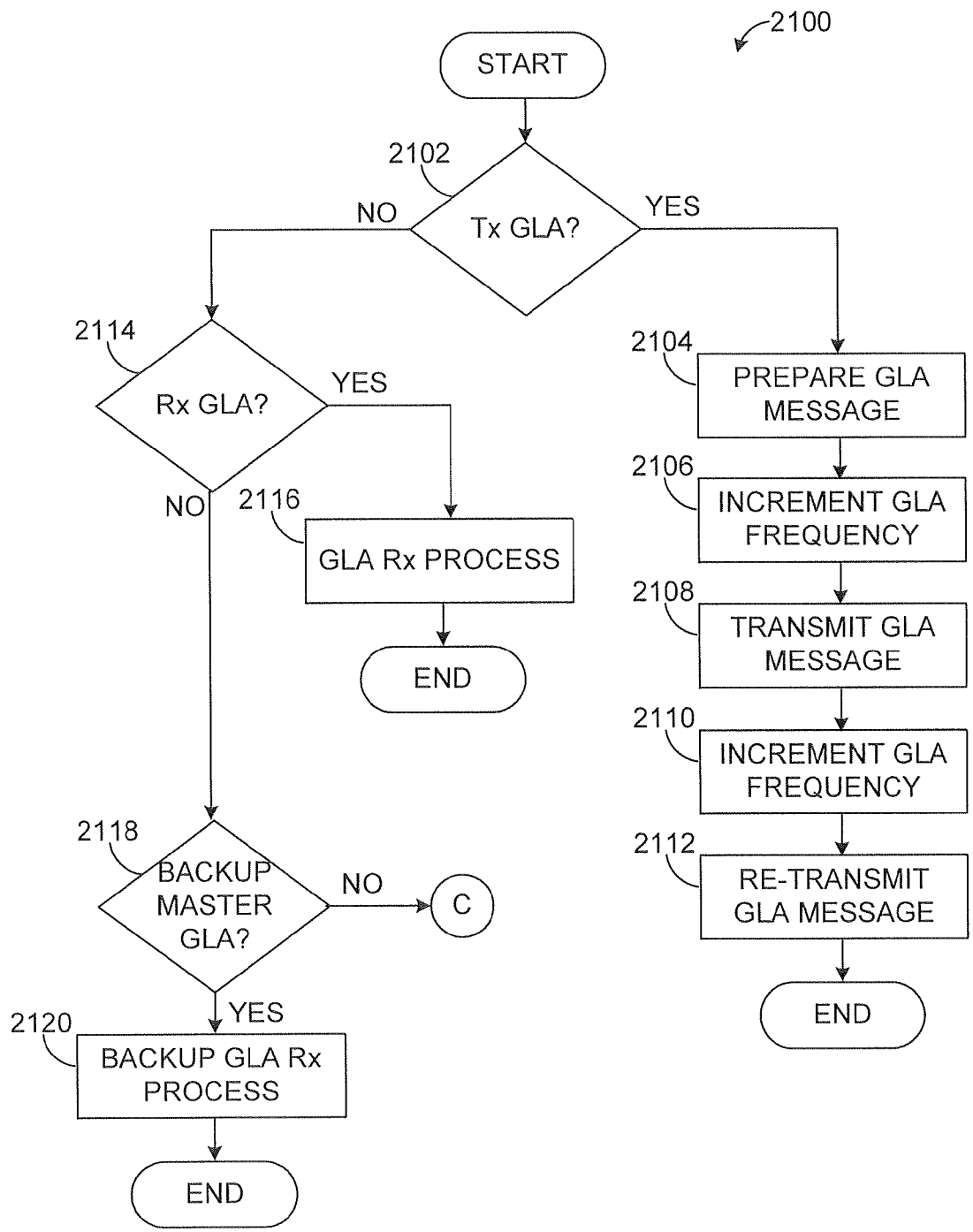
Figure 21B:
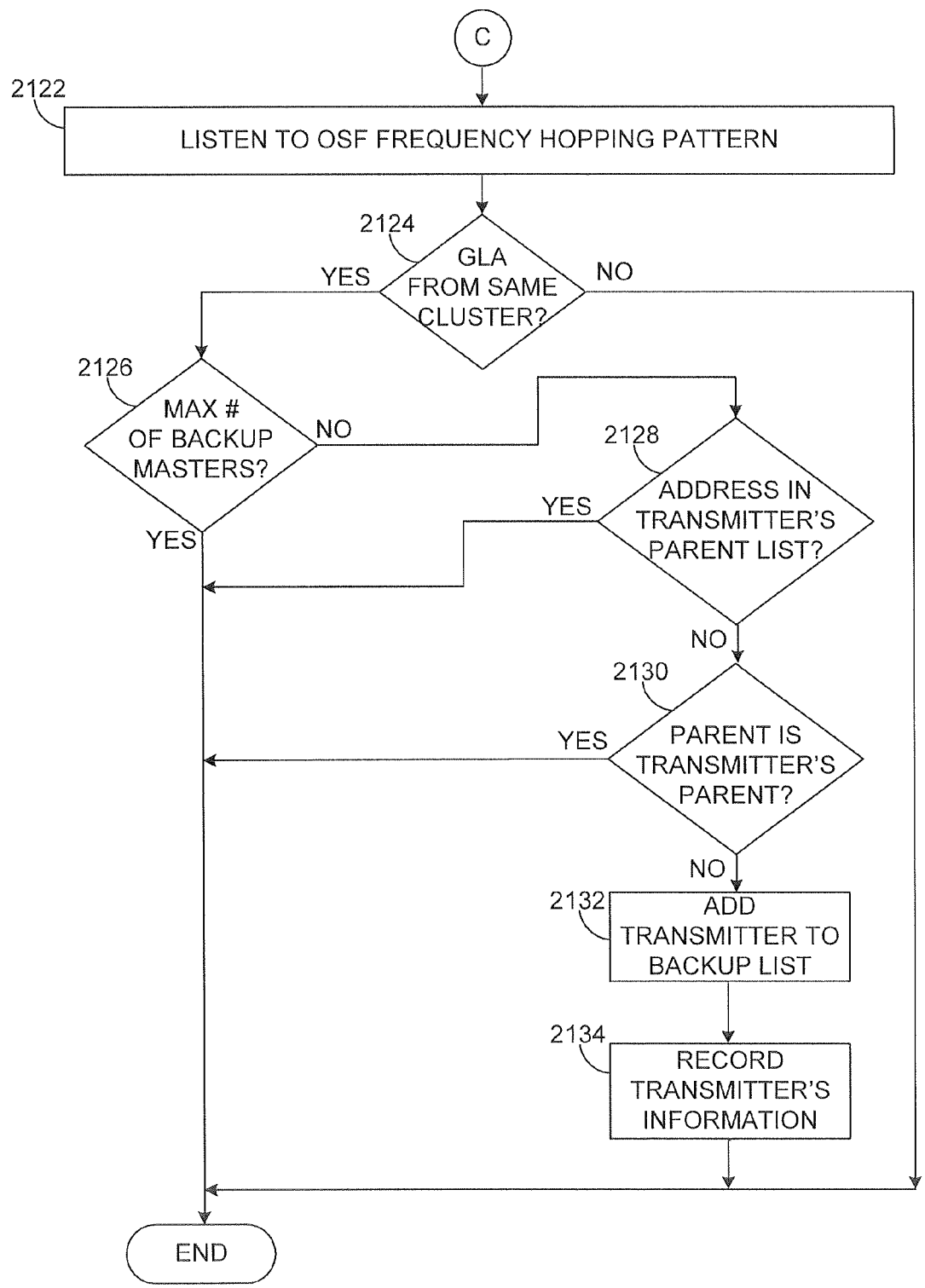

FIG. 20 illustrates an example method 2000 for performing OSF operations in a node. A slot number is initialized to a value (such as zero) at step 2002. The node determines whether a slot with that number is allocated to a leaf node at step 2004. If so, the node performs leaf node processing at step 2006. This could include transmitting data to or receiving data from the leaf node. Otherwise, the node determines whether the slot is a dedicated GLA slot at step 2008. If so, the node performs dedicated GLA slot processing at step 2010, an example of which is shown in FIGS. 21A and 21B. If not a dedicated GLA slot, the node determines whether it receives a clock sync request at step 2012. In this case, the node sends a clock sync acknowledgement at step 2014. In this way, the node can help other nodes synchronize to the frames 400. The slot number is then incremented at step 2016 and a determination is made whether the incremented slot number exceeds a maximum value (such as nine) at step 2018. If not, the method 2000 returns to step 2004 for the next slot in a frame. Otherwise, the OSF 404 has ended, and the method 2000 ends.

FIGS. 21A and 21B illustrate an example method 2100 for dedicated GLA slot processing in a node. If a GLA slot represents a transmit GLA slot at step 2102, the node is going to send time synchronization information to its children nodes. The node prepares a GLA message at step 2104, increments a GLA frequency at step 2106, and transmits the GLA message at step 2108. The node also increments the GLA frequency again at step 2110 and re-transmits the GLA message at step 2112. The transmission of the GLA message multiple times on multiple frequencies can help to ensure that the children nodes receive at least one of the GLA messages.

Figure 22A:
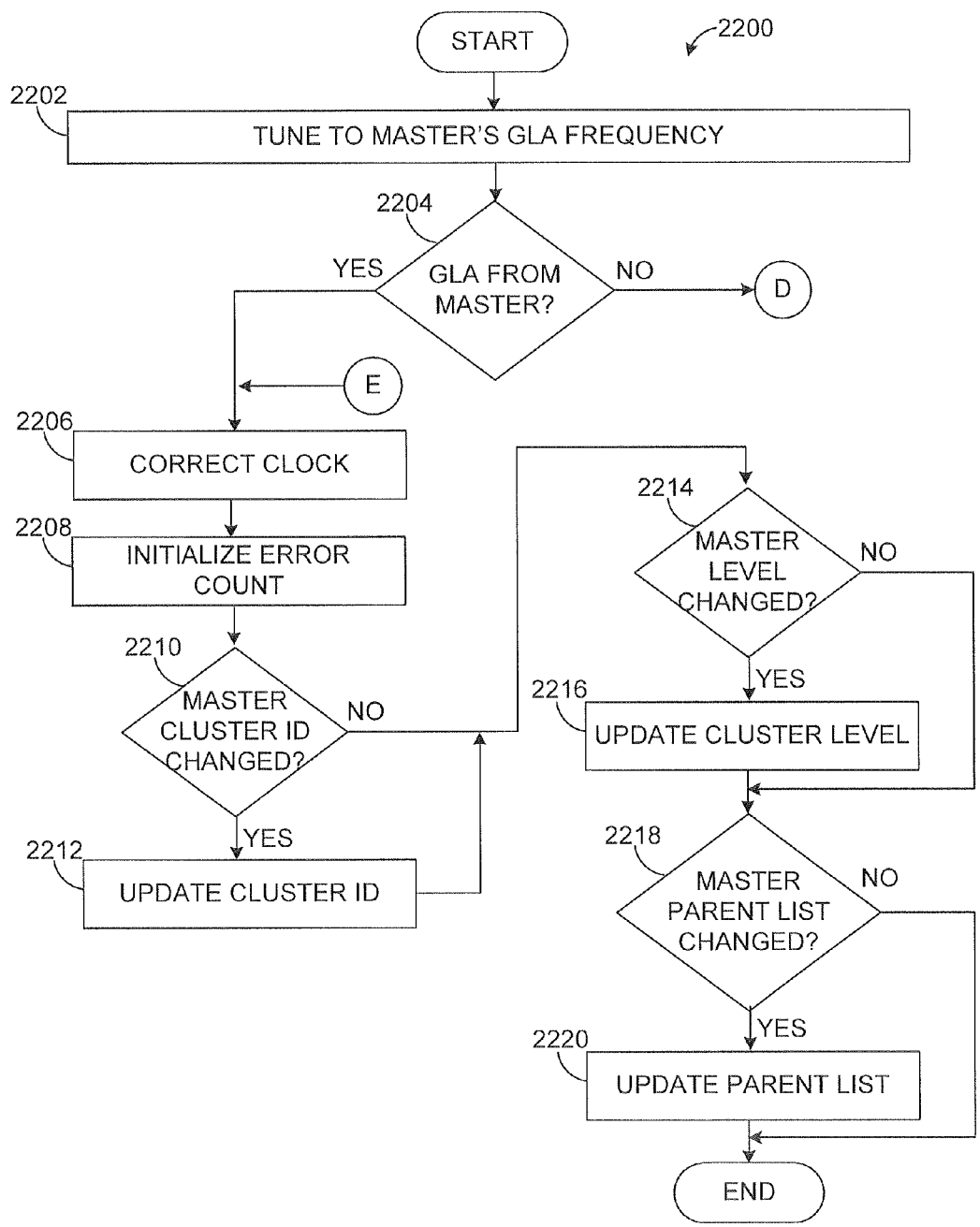
Figure 22B:
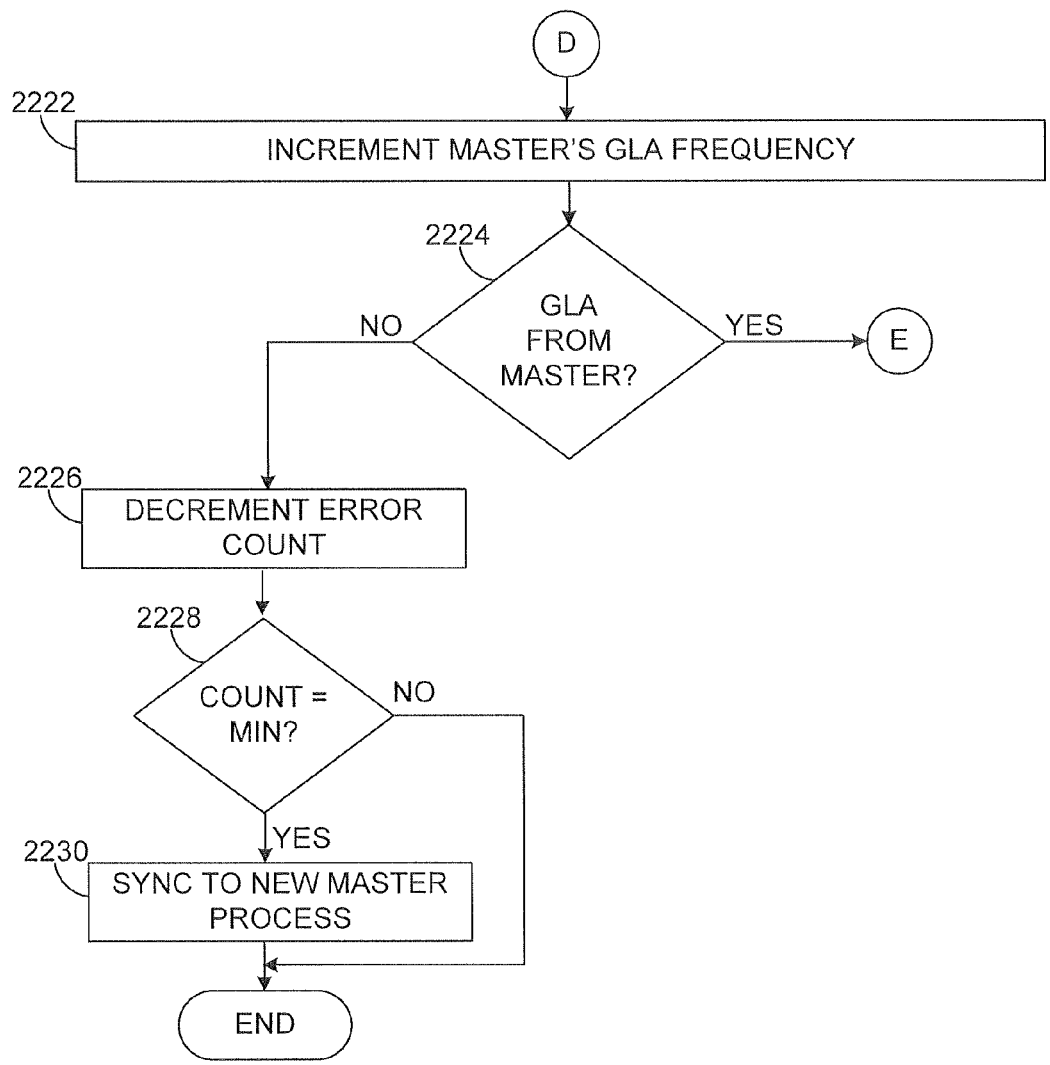
Figure 23:
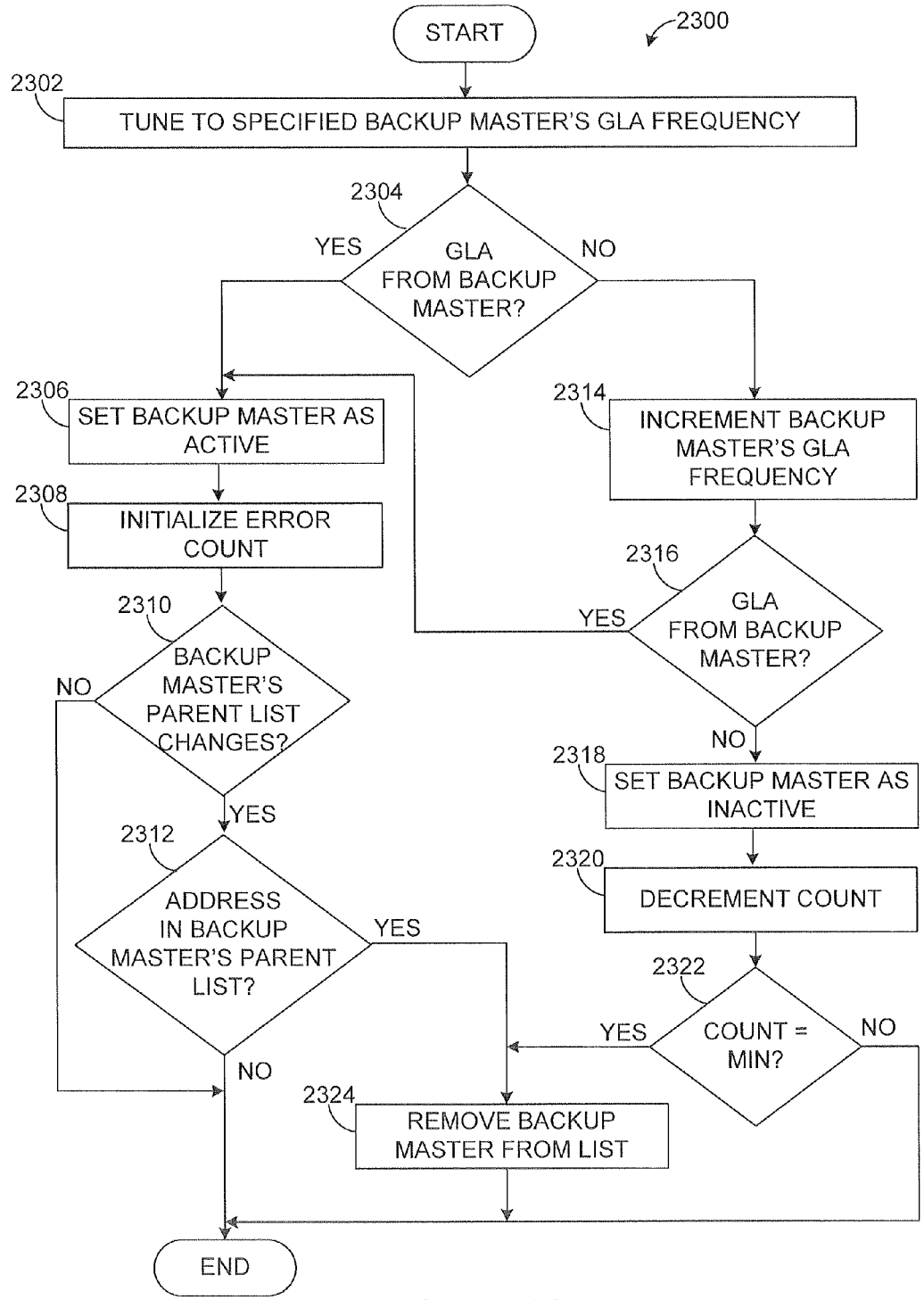

If the GLA slot does not represent a transmit GLA slot at step 2102, a determination is made whether the slot represents a receive GLA slot at step 2114. If so, the node performs a GLA receive process at step 2116, an example of which is shown in FIGS. 22A and 22B. Otherwise, a determination is made whether the GLA slot represents a transmit GLA slot for a backup master at step 2118. If so, the node performs a backup GLA receive process at step 2120, an example of which is shown in FIG. 23.

If the GLA slot is not a transmit GLA slot for a backup master at step 2118, the node listens on the OSF frequency hopping pattern at step 2122. Here, the node attempts to detect other nodes that could act as its backup master. The node determines whether it receives a GLA message from a transmitting node in the same cluster at step 2124. If so, the node determines whether it has identified a maximum number of backup masters (such as three) at step 2126. If not, the node determines whether its address appears in the parent list of the transmitting node at step 2128. A determination is also made whether the node and the transmitting node share the same parent at step 2130. If neither condition is true, the transmitting node is added to a list of potential backup masters at step 2132, and information about the transmitting node is recorded at step 2134. The information could include the transmitting node's GLA frequency and phase information.

Step 2128 is performed so that the selection of potential backup masters does not create loops. A loop could be created when a parent node selects one of its children nodes as a backup master. To avoid looping, a node's backup master cannot be one of that node's children. Other tests or criteria could also be enforced here. For example, a node's backup master should not have selected that node as its backup master. Also, if a node's backup master changes its cluster or changes its level to be greater than the node, that backup master can be dropped.

FIGS. 22A and 22B illustrate an example method 2200 for GLA receive processing in a node. The node tunes to its master's GLA frequency at step 2202 and determines if it receives a GLA message from its master at step 2204. If so, the node uses time synchronization information in the GLA message to correct its internal clock at step 2206 and initializes an error count value (such as to five) at step 2208. The error count value is used to identify if and when the node fails to receive a specified number of consecutive GLA messages from its master. The node determines if its master's cluster identifier has changed at step 2210 and, if so, updates its own cluster identifier at step 2212. Similarly, the node determines if its master's cluster level has changed at step 2214 and, if so, updates its own cluster level at step 2216. In addition, the node determines if its master's parent list has changed at step 2218 and, if so, updates its own parent list at step 2220.

Figure 24A:
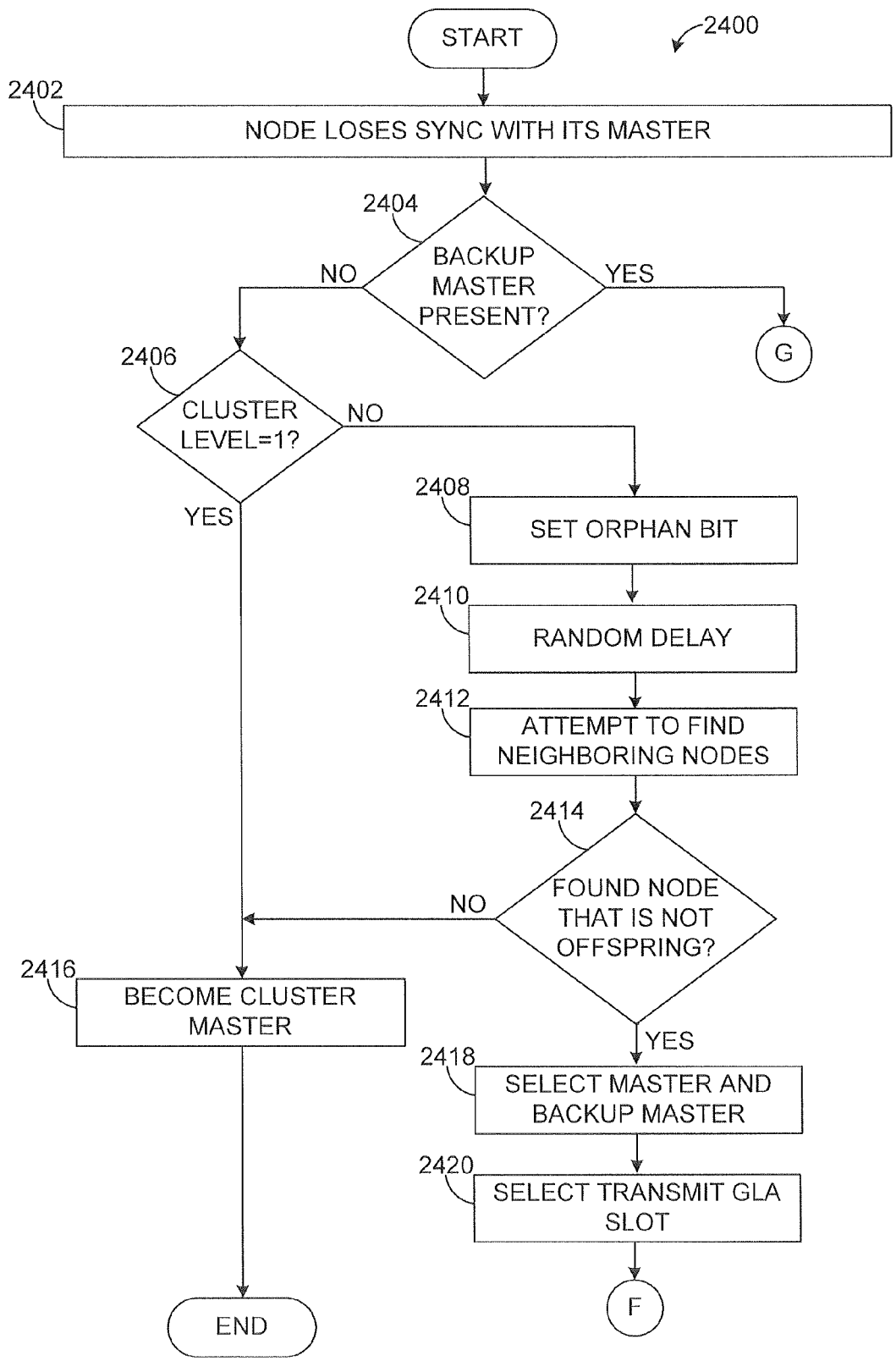
Figure 24B:
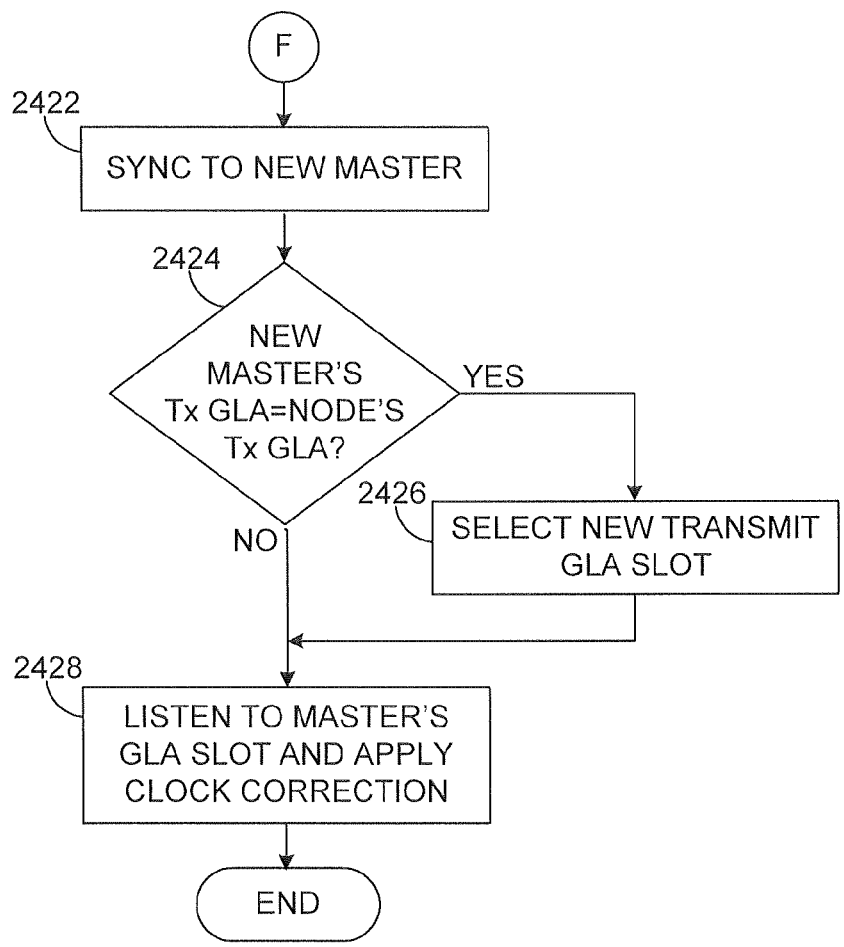

If a GLA message is not received at step 2204, the node increments its master's GLA frequency at step 2222 and attempts to receive a GLA message at step 2224. If received, the method returns to step 2206 to process the received GLA message. If not received, the node decrements the error count value at step 2226 and determines if the error count value equals a minimum value (such as zero) at step 2228. If so, the node performs a "sync to new master" process at step 2230, an example of which is shown in FIGS. 24A and 24B. Otherwise, the method 2200 ends. At this point, the method 2200 can be repeated during the node's next GLA receive slot, and the error count value is maintained between GLA receive slots. The error count value can be used to indicate when five consecutive GLA receive slots (or other number of GLA receive slots) have passed without a successful receipt of a GLA message.

FIG. 23 illustrates an example method 2300 for backup GLA receive processing in a node. The node tunes to its backup master's GLA frequency at step 2302 and determines whether a GLA message is received from the backup master at step 2304. If so, the backup master is set to active in the node's list of backup masters at step 2306, and an error count is initialized (such as to five) at step 2308. If the GLA message indicates a change in the backup master's parent list at step 2310, a decision is made whether the address of the node performing method 2300 appears in the backup master's parent list at step 2312. If so, the node removes the backup master from its list of potential backup masters at step 2324. At this point, the backup master is no longer suitable for use since it could create a time synchronization loop. If the GLA message is not received from the backup master at step 2304, the node increments its backup master's GLA frequency at step 2314 and attempts to receive the retransmission of the GLA message at step 2316. If received, the method returns to step 2306 to process the received message. Otherwise, the node sets the backup master to inactive at step 2318 and decrements the error count at step 2320. If the error count equals a minimum value (such as zero) at step 2322, the backup master is removed from the node's backup master list at step 2324. The method 2300 can be repeated for each backup master in the node's list. In this way, the node can identify when backup masters are no longer available for use in the event the node's current master fails.

Figure 24B:
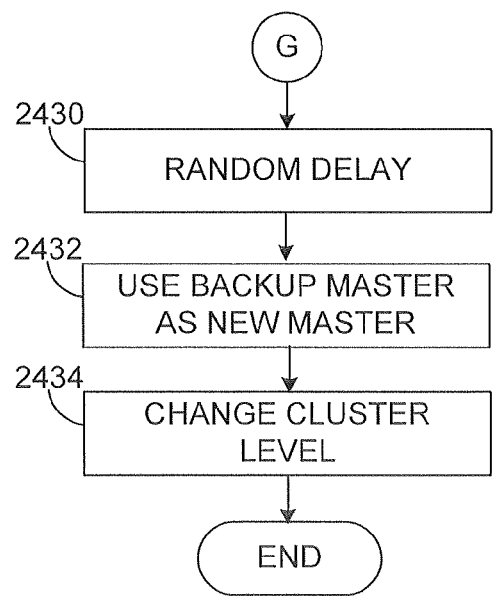

FIG. 24 illustrates an example method 2400 for synchronizing a node to a new master. The node loses synchronization with its current master at step 2402. This could include the node failing to receive five consecutive GLA messages from its current master. If no backup master is present at step 2404, the node determines whether its level equals one at step 2406. In this case, the node has lost direct contact with the cluster master, and the node can immediately become a cluster master at step 2416. The node can set its cluster level to zero and its cluster identifier to an identifier associated with that node.

Otherwise, the node sets its orphan bit at step 2408, which indicates that the node is no longer part of a cluster. With the orphan bit set, the node does not reply to any RSSI beacon messages until the node has a master or it becomes a cluster master. A random delay is implemented at step 2410, which can help to avoid collisions when multiple nodes lose their master at the same time. The delay could be between [0.5*BEACON_TIME], where BEACON_TIME equals one discovery time period (such as 10 seconds). The node then attempts to locate any neighboring nodes at step 2412. If found, a decision is made whether any of the neighboring nodes are children of the node at step 2414 (such as by using the parent lists of the neighboring nodes). If not, the orphan bit is cleared, and the node becomes a cluster master at step 2416.

If a non-child neighboring node of the same cluster is found, a new master and at least one backup master (if available) are selected at step 2418. A transmit GLA slot is selected at step 2420, and the node synchronizes with its new master at step 2422. A decision is made whether the new master's transmit GLA slot equals the node's transmit GLA slot at step 2424. If so, the node selects a new transmit GLA slot at step 2426. In either case, the node listens during its new master's transmit GLA slot and corrects its clock at step 2428.

If a backup master is present at step 2404, the node implements a random delay at step 2430 (which may or may not equal the random delay of step 2410). The node begins using its backup master as its new master at step 2432. If necessary, the node changes its cluster level based on the cluster level of its new master at step 2434.

Using these various methods, nodes in a wireless network can join together into clusters and share time synchronization information. The nodes can also enter and leave clusters as communications with master nodes are found and lost.

Although FIGS. 16 through 24B illustrate examples of methods for time synchronization in a wireless network, various changes may be made to FIGS. 16 through 24B. For example, other methods could be used to provide the same or similar functionality in a wireless network. Also, while shown as a series of steps, various steps in each of these figures could overlap, occur in parallel, occur multiple times, or occur in a different order.

FIGS. 25 through 28 illustrate example methods for merging clusters of wireless nodes in a wireless network according to this disclosure. The embodiments of the methods shown in FIGS. 25 through 28 are for illustration only. Other methods for merging clusters of wireless network nodes could be used without departing from the scope of this disclosure.

Figure 25:
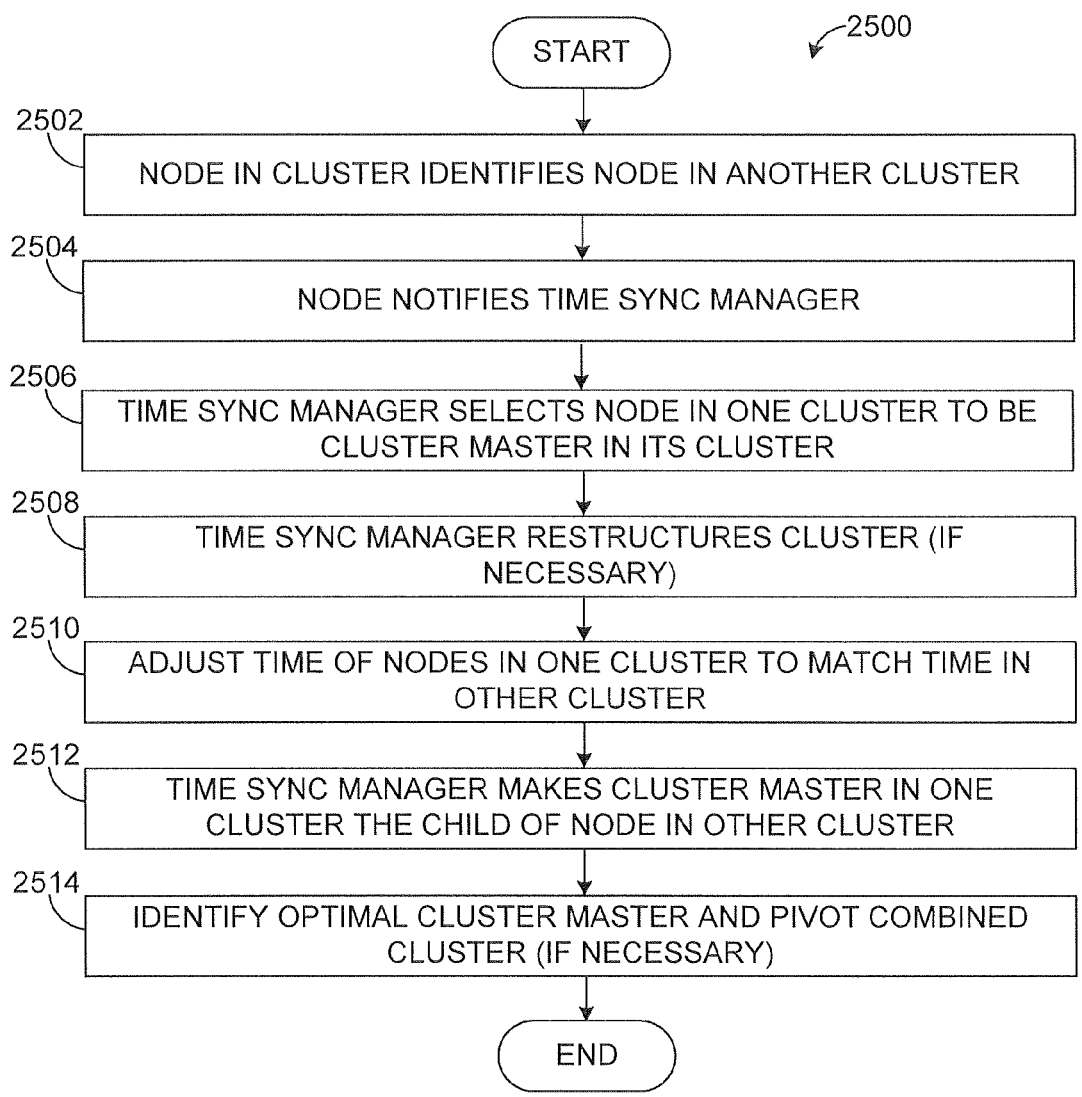
FIGS. 25 through 28 illustrate example methods for merging clusters of wireless nodes in a wireless network according to this disclosure.

In FIG. 25, a method 2500 defines a high-level cluster merge process. A node in one cluster identifies a node in another cluster at step 2502. This could include, for example, a node in one cluster detecting GLA or other transmissions from a node in another cluster. The node that identifies the other cluster notifies a time synchronization manager of the detected cluster at step 2504. In response, the time synchronization manager can select one of the nodes in one of the clusters (the joining cluster) to act as the cluster master for its cluster at step 2506. The time synchronization manager then restructures the joining cluster to make the identified node its cluster master (if it is not already the cluster master) at step 2508. The nodes in the joining cluster are adjusted so that their time matches the time of the nodes in the other cluster at step 2510. The nodes in the two clusters are now operating using substantially identical concepts of time. The cluster master in the joining cluster is made the child of a node in the other cluster at step 2512. This causes all of the nodes in the joining cluster to become children of a node in the other cluster, forming a single larger cluster. If necessary, a more optimal cluster master for the combined cluster can be identified and the cluster can be reorganized at step 2514. The optimal cluster master could, for instance, represent the node having access to an accurate clock (such as a GPS or atomic clock). Alternatively, the cluster master may be chosen to minimize the number of levels in the combined cluster.

Figure 26:
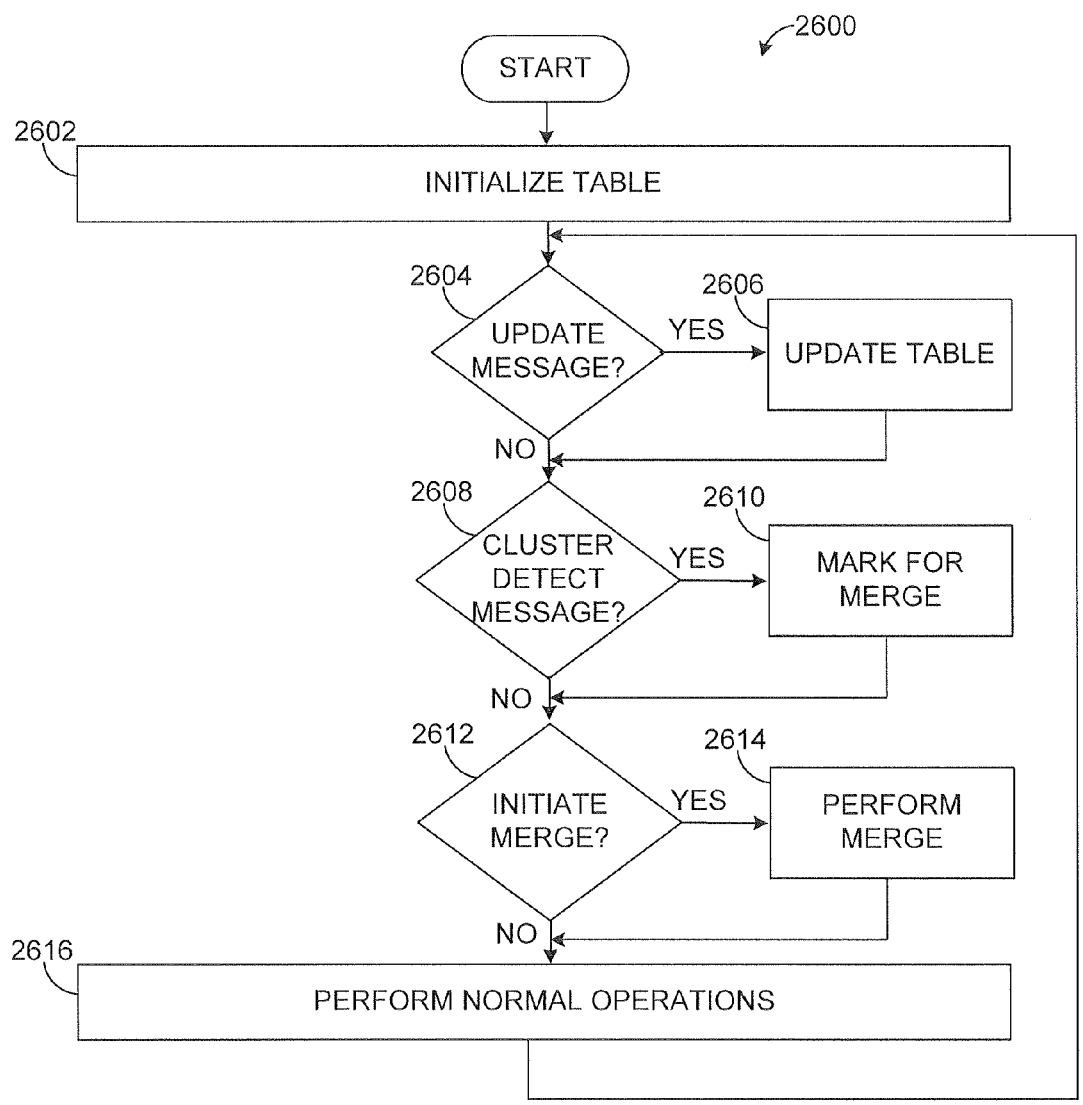

FIG. 26 illustrates an example method 2600 for tracking potential merge points for clusters and merging the clusters. A table is initialized at step 2602. This could include, for example, preparing a table with the following fields: node identifier, node master, transmit GLA slot, master phase delta, backup master list, and cluster identifier. These fields relate to information about the time sync spanning tree structure of a cluster and a wireless node that detects another cluster and sends a cluster detect message to the time synchronization manager 122. If an update message is received at step 2604, the table is updated at step 2606. Updating the table could include extracting a node identifier from the update message and determining if an entry in the table already exists for that identifier. An entry can be created and populated with data if not, or an entry can be updated if it already exists. Also, a staleness counter for the new or updated entry could be reset (which can help to ensure that only newer data is used to merge clusters).

Figure 27:
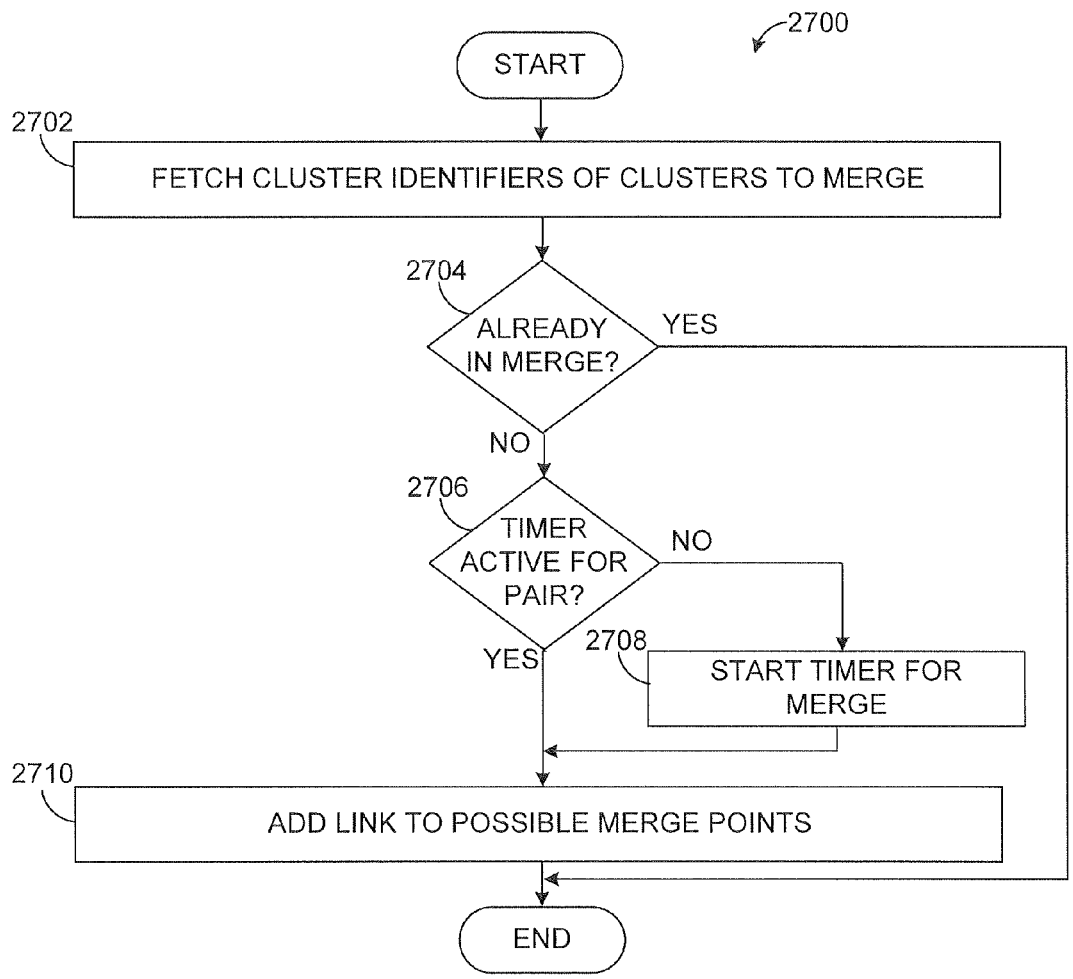
Figure 28:
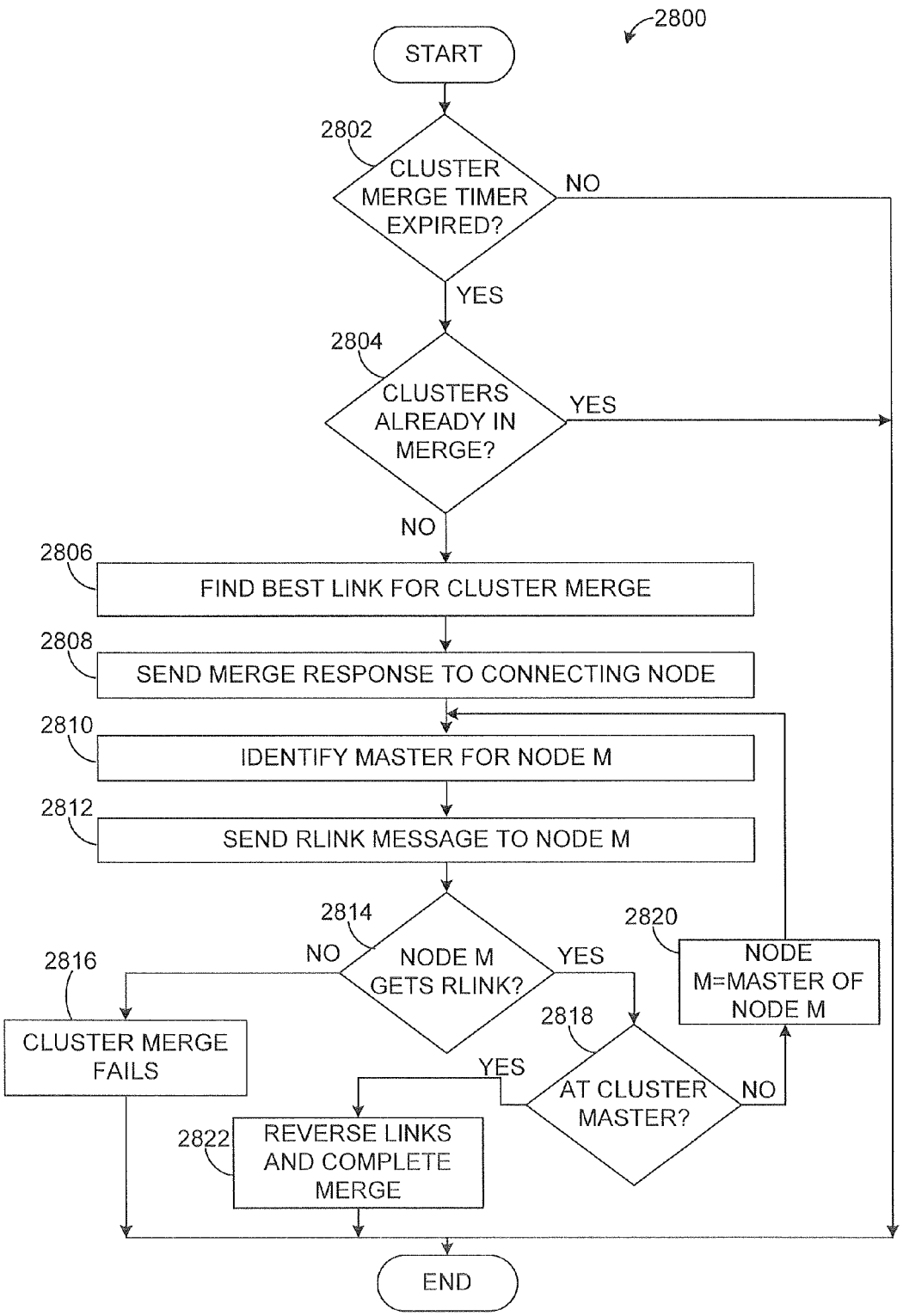

If a cluster detect message is received at step 2608, a mark for merge process can be performed at step 2610, an example of which is shown in FIG. 27. If a cluster merge is initiated at step 2612, a merge process is performed at step 2614, an example of which is shown in FIG. 28. The time synchronization manager could then perform any other normal operations at step 2616, such as operations unrelated to cluster merges.

FIG. 27 illustrates an example method 2700 for marking clusters for merging. The cluster identifiers for two clusters to be merged are fetched at step 2702. This could include, for example, the time synchronization manager 122 receiving a cluster detect message identifying two clusters (the cluster of the detecting node and the cluster detected by the detecting node). If the two clusters are already being merged at step 2704, the method 2700 ends. Otherwise, a decision is made whether an active timer has been set for the pair of clusters at step 2706. If not, one is initialized and started at step 2708. The timer defines a period of time (such as 30 seconds) during which other connections between two clusters can be identified. The link contained in the cluster detect message is added to a list of possible merge points at step 2710. At this point, the mark for merge process is complete, although the mark for merge process could be performed multiple times for different pairs of nodes in two clusters before the merge timer expires.

FIG. 28 illustrates an example method 2800 for merging clusters. Here, once a merge timer expires at step 2802, the time synchronization manager 122 has collected one or more possible merge points for two clusters. The merge points represent links between nodes in the two clusters. A merge of the two clusters can therefore be initiated if the two clusters are not already being merging at step 2804. If not, the best link for performing the cluster merge is identified at step 2806. This could include, for example, the time synchronization manager 122 selecting the link with the lowest combined cluster levels of its nodes. At this point, a merge response can be sent to a connecting node at step 2808. The connecting node could represent the node that is going to be made the cluster master of its cluster prior to the clusters merging.

A master of node M is identified at step 2810. Initially, node M may represent the connecting node that received the merge response. An rLink message is sent to the identified master of node M at step 2812. The rLink request could include the transmit GLA slot of node M and node M's phase delta. The rLink request can be used to facilitate reversal of one of the links that exists between the connecting node and the current cluster master of the connecting node. In this example, rLink requests are first sent to the current cluster master and to the nodes between the connecting node and the current cluster master. Also, in this particular example, most of the rLink requests do not result in the immediate reversal of the directional link between two nodes.

If node M does not successfully receive the rLink message at step 2814, the cluster merge fails at step 2816. Note that this could actually involve sending multiple rLink messages to node M (such as three messages as shown in FIG. 13). If node M successfully receives the rLink message, a determination is made whether node M is currently the cluster master of the cluster in which the connecting node resides at step 2818. If not, node M is reassigned to equal the master at step 2820, and the process returns to step 2810 to identify the master for the new node M. This process continues until the current cluster master and the nodes between the connecting node and the current cluster master have received an rLink message. At this point, the directional communication links between the connecting node and the current cluster master are reversed, the connecting node becomes the new cluster master, and the merge process is completed at step 2822. This could include reversing the links between the current cluster master and the connecting node in sequence, starting at the current cluster master. The current cluster master could reverse its directional link in response to receiving the rLink message. If the reversals are successful, this could also include the new cluster master informing the time synchronization manager 122 that the move was successful. This could further include the new cluster master performing a time jump to correct the time of the new cluster master and its children. In addition, this could include causing the new cluster master to become a child of a node in another cluster.

Although FIGS. 25 through 28 illustrate examples of methods for merging clusters of wireless nodes in a wireless network, various changes may be made to FIGS. 25 through 28. For example, other methods could be used to provide the same or similar functionality in a wireless network. Also, while shown as a series of steps, various steps in each of these figures could overlap, occur in parallel, occur multiple times, or occur in a different order.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:

multiple wireless nodes forming a cluster in a wireless network, each wireless node configured to communicate and exchange data wirelessly based on a clock;

wherein one of the wireless nodes is configured to operate as a cluster master and each of the other wireless nodes is configured to (i) receive time synchronization information from a parent node, (ii) adjust its clock based on the received time synchronization information, and (iii) broadcast time synchronization information based on the time synchronization information received by that wireless node;

wherein the time synchronization information received by each of the other wireless nodes is based on time synchronization information provided by the cluster master so that the other wireless nodes substantially synchronize their clocks with the clock of the cluster master; and wherein each of the other wireless nodes is configured to automatically select its parent node, the parent nodes arranged into a plurality of levels in the cluster.

2. The system of claim 1, wherein:

the wireless network comprises multiple clusters; and different clusters are capable of being synchronized to different times using time synchronization information provided by different cluster masters.

3. The system of claim 1, wherein the cluster master is configured to generate the time synchronization information it provides based on an external clock signal.

4. The system of claim 3, wherein the external clock signal comprises one of: an atomic clock signal and a global positioning system (GPS) clock signal.

5. The system of claim 1, wherein each of the other wireless nodes is configured to automatically select its parent node based on at least one of: the cluster level associated with its parent node, an accuracy of its parent node's clock, and a wireless link quality associated with its parent node.

6. The system of claim 1, wherein each of the other wireless nodes is further configured to:

receive a parent list from at least a specified one of the wireless nodes, the parent list identifying any wireless nodes through which time synchronization information flows from the cluster master to the specified wireless node; and use the parent list to ensure that no loop is formed in the cluster.

7. The system of claim 1, wherein each of the other wireless nodes is further configured to select a backup parent node and to immediately switch to receiving time synchronization information from the backup parent node when no synchronization messages are received from a current parent node for a threshold time period.

8. The system of claim 7, wherein each of the other wireless nodes is further configured to become a new cluster master if synchronization messages are not received from its current parent node for the threshold time period and no backup parent nodes are available.

9. The system of claim 1, wherein the time synchronization information from each wireless node is included in messages having contents unrelated to time synchronization.

10. A system comprising:

multiple first wireless nodes forming a cluster in a wireless network, each first wireless node configured to communicate and exchange data wirelessly based on a clock; and at least one second wireless node configured to communicate wirelessly with at least one of the first wireless nodes;

wherein one of the first wireless nodes is configured to operate as a cluster master and each of the other first wireless nodes is configured to (i) receive time synchronization information from a parent node, (ii) adjust its clock based on the received time synchronization information, and (iii) broadcast time synchronization information based on the time synchronization information received by that wireless node;

wherein the time synchronization information received by each of the other first wireless nodes is based on time synchronization information provided by the cluster master so that the other first wireless nodes substantially synchronize their clocks with the clock of the cluster master;

wherein each second wireless node is configured to receive time synchronization information from at least one of the first wireless nodes and to substantially synchronize its clock with the clock of the cluster master without broadcasting the received time synchronization information to any other nodes; and wherein each second wireless node is configured to enter a sleep state and to wake up during a scheduled period for receipt of the time synchronization information.

11. A wireless node comprising:

a transceiver configured to communicate with other wireless nodes including a second wireless node and a third wireless node in a wireless network cluster, the second wireless node comprising a first parent node; and a controller configured to:
- select the first parent node;
- receive time synchronization information from the first parent node;
- substantially synchronize the wireless node to the first parent node using the received time synchronization information;
- initiate transmission of time synchronization information to the third wireless node, the third wireless node configured to substantially synchronize to the first parent node using the transmitted time synchronization information; and
- select a second parent node and substantially synchronize the wireless node to the second parent node using time synchronization information received from the second parent node when communication with the first parent node is lost or interrupted.

12. The wireless node of claim 11, wherein the controller is further configured to enter a sleep state and to wake up during a scheduled period for receipt of the time synchronization information from the second wireless node.

13. The wireless node of claim 11, wherein:

the first parent node is a first number of hops away from a cluster master of the wireless network cluster, the second parent node is a second number of hops away from the cluster master, and the second number of hops is less than or equal to the first number of hops.

14. The wireless node of claim 11, wherein the controller is further configured to:

receive a parent list from each of the parent nodes, each parent list identifying any nodes through which time synchronization information flows from the cluster master to one of the parent nodes; and use the parent lists to ensure that no loop is formed in the wireless network cluster.

15. The wireless node of claim 11, wherein the controller is further configured to become a new cluster master when communication with the first parent node is lost or interrupted and no second parent nodes are available.

16. A method comprising:

receiving time synchronization information from a first wireless node at a second wireless node, the first wireless node comprising a first parent node of the second wireless node;

substantially synchronizing the second wireless node to the first wireless node using the received time synchronization information;

transmitting time synchronization information from the second wireless node to a third wireless node in the cluster, the third wireless node configured to substantially synchronize to the second wireless node using the transmitted time synchronization information, the wireless nodes forming at least part of a cluster in a wireless network; and selecting a second parent node, receiving time synchronization information from the second parent node at the second wireless node, and substantially synchronizing the second wireless node to the second parent node using the time synchronization information from the second parent node when communication with the first parent node is lost or interrupted.

17. The method of claim 16, wherein:

the first parent node is a first number of hops away from a cluster master of the cluster, the second parent node is a second number of hops away from the cluster master, and the second number of hops is less than or equal to the first number of hops.

18. The method of claim 16, further comprising:

using parent lists of the first and second parent nodes to ensure that no loop is formed in the cluster, each parent list identifying any nodes through which time synchronization information flows from the cluster master to one of the parent nodes.

19. The method of claim 17, wherein:

the nodes in the cluster are arranged as a spanning tree; and the second parent node is selected to minimize the second number of hops.

20. A method comprising:

receiving time synchronization information from a first wireless node at a second wireless node in a first specified time slot;

substantially synchronizing the second wireless node to the first wireless node using the received time synchronization information; and transmitting time synchronization information from the second wireless node to a third wireless node in the cluster in a second specified time slot, the third wireless node configured to substantially synchronize to the second wireless node using the transmitted time synchronization information, the wireless nodes forming at least part of a cluster in a wireless network;

wherein the first and second specified time slots are reserved for exchanging the time synchronization information.

* * * * *